(12) United States Patent
Onouchi et al.

(10) Patent No.: US 11,407,303 B2
(45) Date of Patent: Aug. 9, 2022

(54) CONTROL DEVICE

(71) Applicant: AISIN CORPORATION, Kariya-shi (JP)

(72) Inventors: Tomohiro Onouchi, Anjo (JP); Kohei Tsuda, Nishio (JP); Yuki Nagano, Kariya (JP)

(73) Assignee: AISIN CORPORATION, Kariya (JP)

( * ) Notice: Subject to any disclaimer, the term of this patent is extended or adjusted under 35 U.S.C. 154(b) by 324 days.

(21) Appl. No.: 16/622,968

(22) PCT Filed: Jul. 17, 2018

(86) PCT No.: PCT/JP2018/026723
§ 371 (c)(1),
(2) Date: Dec. 16, 2019

(87) PCT Pub. No.: WO2019/017337
PCT Pub. Date: Jan. 24, 2019

(65) Prior Publication Data
US 2021/0146769 A1    May 20, 2021

(30) Foreign Application Priority Data

Jul. 18, 2017   (JP) .............................. JP2017-139036
Mar. 1, 2018    (JP) .............................. JP2018-036902

(51) Int. Cl.
*B60W 10/06*       (2006.01)
*B60K 6/445*       (2007.10)
(Continued)

(52) U.S. Cl.
CPC ................ *B60K 6/445* (2013.01); *B60K 6/48* (2013.01); *B60K 6/547* (2013.01); *B60W 10/11* (2013.01);
(Continued)

(58) Field of Classification Search
CPC .......... B60K 6/445; B60K 6/48; B60K 6/547; B60K 17/354; B60K 2006/4825;
(Continued)

(56) References Cited

U.S. PATENT DOCUMENTS 5,743,826 A    4/1998   Usuki et al.
2008/0033620 A1    2/2008   Kamichi et al.
(Continued)

FOREIGN PATENT DOCUMENTS

JP    H08-254262 A    10/1996
JP    H11-230330 A    8/1999
(Continued)

OTHER PUBLICATIONS

Sep. 18, 2018 International Search Report issued in International Patent Application No. PCT/JP2018/026723.

*Primary Examiner* — Justin Holmes
(74) *Attorney, Agent, or Firm* — Oliff PLC

(57) ABSTRACT

A control device with an electronic control unit that is configured to perform specific supply control, the specific supply control driving at least one of the rotating electrical machine and the internal combustion engine in a neutral state, and supplying hydraulic pressure to an engagement operating part of a target engagement device with at least one of the rotating electrical machine and the internal combustion engine being driven, the automatic transmission not transmitting power in the neutral state, and the target engagement device being one of the plurality of transmission engagement devices.

20 Claims, 13 Drawing Sheets

(51) Int. Cl.

| | | |
|---|---|---|
| *B60K 6/547* | (2007.10) | |
| *B60W 10/11* | (2012.01) | |
| *B60W 20/30* | (2016.01) | |
| *B60K 6/48* | (2007.10) | |
| *B60W 30/18* | (2012.01) | |
| *F16H 61/04* | (2006.01) | |
| *B60W 10/08* | (2006.01) | |
| *F16H 61/00* | (2006.01) | |
| *B60K 17/354* | (2006.01) | |

(52) U.S. Cl.
CPC .......... *B60W 20/30* (2013.01); *B60K 17/354* (2013.01); *B60K 2006/4825* (2013.01); *B60W 10/06* (2013.01); *B60W 10/08* (2013.01); *B60W 30/18054* (2013.01); *B60W 2510/0638* (2013.01); *F16H 2061/0087* (2013.01); *F16H 2061/0459* (2013.01); *F16H 2061/0488* (2013.01); *F16H 2342/04* (2013.01)

(58) Field of Classification Search
CPC ...... B60W 10/11; B60W 20/30; B60W 10/06; B60W 10/08; B60W 30/18054; B60W 2510/0638; F16H 2061/0087; F16H 2061/0459; F16H 2061/0488; F16H 2342/04; F16H 61/686; F16H 2200/2007; F16H 2200/2023; F16H 2200/2069; F16H 2200/2082; F16H 61/0213; F16H 61/061; F16H 3/663; F16H 2200/006; F16H 2200/0086; F16H 2200/2046; F16H 63/50; B60L 15/2054; B60L 2240/486; B60L 2240/507; B60L 2250/26; B60L 2260/46; B60L 50/16; Y02T 10/62; Y02T 10/64; Y02T 10/7072; Y02T 10/72

See application file for complete search history.

(56) References Cited

U.S. PATENT DOCUMENTS

| | | | |
|---|---|---|---|
| 2008/0234885 A1* | 9/2008 | Suzuki ................. | B60W 10/115 701/22 |
| 2013/0109531 A1* | 5/2013 | Hoshiba ............... | B60W 10/115 477/52 |
| 2014/0129119 A1* | 5/2014 | Park ...................... | B60W 20/00 701/113 |
| 2017/0274894 A1 | 9/2017 | Sato et al. | |
| 2018/0147931 A1 | 5/2018 | Toyota et al. | |

FOREIGN PATENT DOCUMENTS

| | | | | |
|---|---|---|---|---|
| JP | 2006-234063 | A | 9/2006 | |
| JP | 2012-91560 | A | 5/2012 | |
| JP | 2017-175711 | A | 9/2017 | |
| WO | 2016/208003 | A1 | 12/2016 | |
| WO | WO-2017057367 | A1 * | 4/2017 | ............ B60W 10/06 |

\* cited by examiner

| | CL | | | | | | F1 |
|---|---|---|---|---|---|---|---|
| | C1 | C2 | C3 | C4 | B1 | B2 | |
| N | | | | | | | |
| 1st | ○ | | | | | (○) | ○ |
| 2nd | ○ | | | | ○ | | |
| 3rd | ○ | | ○ | | | | |
| 4th | ○ | | | ○ | | | |
| 5th | ○ | ○ | | | | | |
| 6th | | ○ | | ○ | | | |
| 7th | | ○ | ○ | | | | |
| 8th | | ○ | | | ○ | | |
| Rev1 | | | ○ | | | ○ | |
| Rev2 | | | | ○ | | ○ | |

(○): When engine braking

CONTROL DEVICE

BACKGROUND

The present disclosure relates to a control device whose control target is a vehicle drive device.

A vehicle drive device is used in which an automatic transmission having a plurality of hydraulically actuated transmission engagement devices is provided in a power transmission path that connects an input member drive-coupled to an internal combustion engine to output members drive-coupled to wheels. As a control device for such a vehicle drive device, JP H08-254262 A discloses one that learns response characteristics obtained when hydraulic pressure is supplied to an engagement operating part of one of a plurality of transmission engagement devices, upon changing gears from a neutral state such as at garage shift. Specifically, JP H08-254262 A discloses learning of the time taken from start of supply of hydraulic pressure to an engagement operating part of a transmission engagement device to be engaged until there is no more clearance between a plurality of friction plates provided in the engagement operating part (so-called backlash elimination time).

However, in a technique of JP H08-254262 A, a change in the rotational speed of a transmission input member of an automatic transmission is detected, a transmission start point in time is determined based on the change in the rotational speed, and a backlash elimination time is learned and corrected based on a result of the determination. Hence, for example, in a situation in which a vehicle is being stopped, etc., and thus, an internal combustion engine is stopped and the transmission input member of the automatic transmission is not rotating, either, learning control has not been able to be performed. Namely, in the technique of JP H08-254262 A, opportunities for actually performing learning control have been limited.

SUMMARY

An exemplary aspect of the disclosure allows for many learning opportunities for response characteristics of transmission engagement devices upon changing gears from a neutral state to be easily secured.

A control device according to the present disclosure is a control device whose control target is a vehicle drive device provided with an automatic transmission having a plurality of hydraulically actuated transmission engagement devices in a power transmission path that connects an input drive-coupled to an internal combustion engine to outputs drive-coupled to wheels, and in the vehicle drive device, a rotating electrical machine is provided more on an input side than the automatic transmission in the power transmission path, and the control device including an electronic control unit that is confirmed to perform specific supply control, the specific supply control driving at least one of the rotating electrical machine and the internal combustion engine in a neutral state, and supplying hydraulic pressure to an engagement operating part of a target engagement device with at least one of the rotating electrical machine and the internal combustion engine being driven, the automatic transmission not transmitting power in the neutral state, and the target engagement device being one of the plurality of transmission engagement devices.

According to this configuration, by actively driving at least one of the rotating electrical machine and the internal combustion engine in a neutral state, a rotating member on an input side of the automatic transmission can be rotated.

Then, in that state, by supplying hydraulic pressure to an engagement operating part of a target engagement device, response characteristics of the transmission engagement device can be learned. As such, according to this configuration, learning is possible even in a situation in which normally the rotating member on the input side of the automatic transmission does not rotate, and thus, many learning opportunities for response characteristics of the transmission engagement devices can be easily secured.

Further features and advantages of the technique according to the present disclosure will become more apparent from the following description of illustrative and non-restrictive embodiments which will be described with reference to drawings.

DETAILED DESCRIPTION OF EMBODIMENTS

First Embodiment

A first embodiment of a control device will be described with reference to the drawings. The control device 1 is a control device for a vehicle drive device whose control target is a vehicle drive device 3. The vehicle drive device 3 which is a control target of the control device 1 is a drive device for driving a vehicle V (hybrid vehicle) including both an internal combustion engine EG and a rotating electrical machine 33. The vehicle drive device 3 is formed as a parallel hybrid vehicle drive device for driving a parallel-type hybrid vehicle.

In the following description, "drive-coupled" refers to a state in which two rotating elements are coupled together so that drive power (synonymous with torque) can be transmitted. This concept includes a state in which two rotating elements are coupled together such that they rotate together, and a state in which two rotating elements are coupled together via one or more power transmission members so that drive power can be transmitted. Such power transmission members include various types of members (shafts, gear mechanisms, belts, etc.) that transmit rotation at the same speed or at a changed speed, and may include engagement devices (friction engagement devices, mesh engagement devices, etc.) that selectively transmit rotation and drive power.

In addition, the "rotating electrical machine" is used as a concept that includes all of a motor, a generator, and a motor-generator that functions as both a motor and a generator as necessary.

Figure 1:
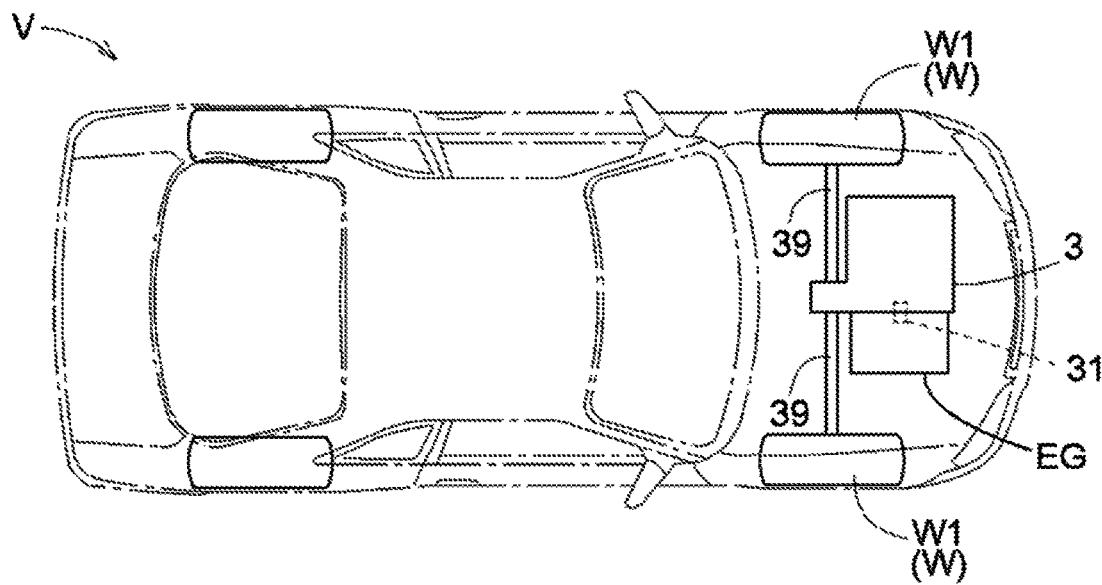
FIG. 1 is a schematic diagram of a vehicle having a vehicle drive device of a first embodiment mounted thereon.
Figure 2:
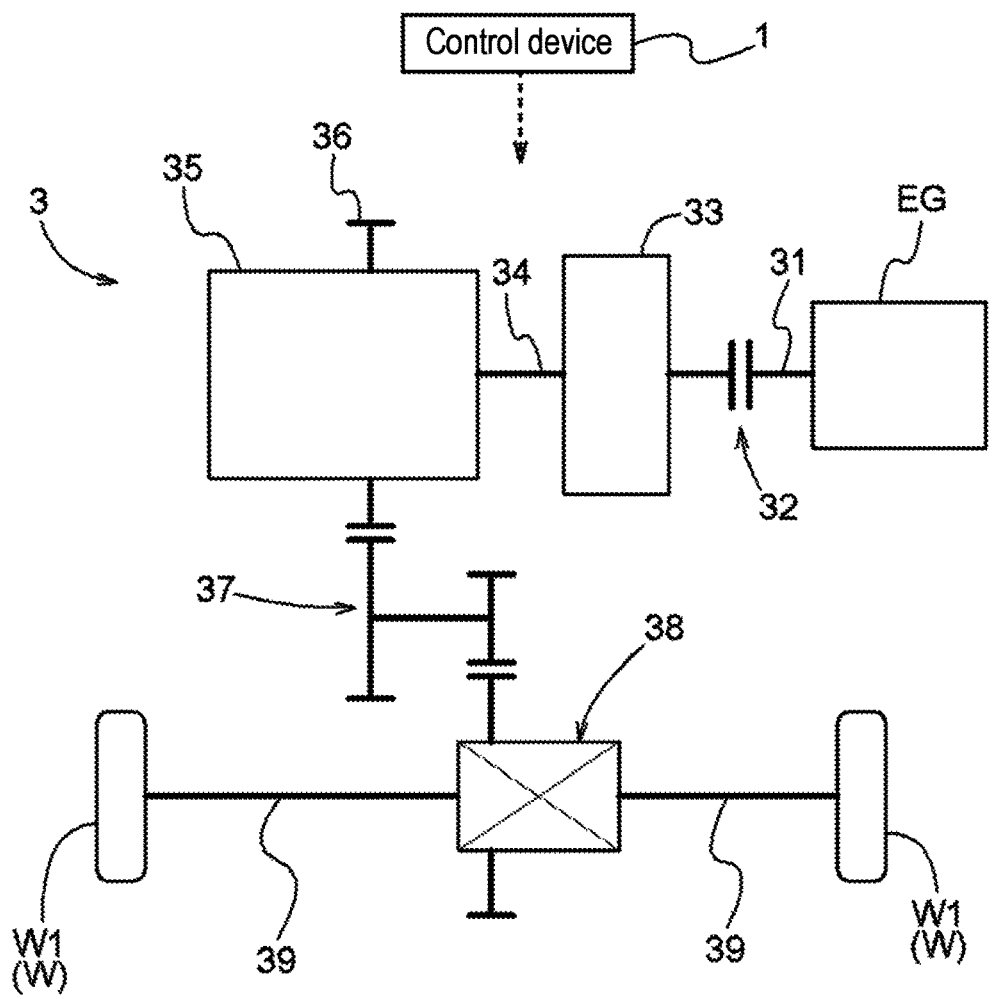
FIG. 2 is a schematic diagram of the vehicle drive device.

As shown in FIG. 1, the vehicle drive device 3 is formed as a drive device for a front-engine front-drive (FF) vehicle. The vehicle drive device 3 is provided so that drive power can be transmitted to wheels W (in the present embodiment, first wheels W1 which are front wheels of the vehicle V) with the internal combustion engine EG alongside the vehicle drive device 3. As shown in FIG. 2, the vehicle drive device 3 includes a disconnection engagement device 32, the rotating electrical machine 33, an automatic transmission 35, a counter gear mechanism 37, and a differential gear device 38 in a power transmission path connecting the internal combustion engine EG to the wheels W (first wheels W1). In addition, the vehicle drive device 3 includes an input member 31, a transmission input member 34, a transmission output member 36, and output members 39 in the power transmission path so as to transmit rotation and drive power between constituent members. The input member 31, the disconnection engagement device 32, the rotating electrical machine 33, the transmission input member 34, the automatic transmission 35, the transmission output member 36, the counter gear mechanism 37, the differential gear device 38, and the output members 39 are provided in the order of description from an internal combustion engine EG side in the power transmission path.

The input member 31 is drive-coupled to the internal combustion engine EG. The internal combustion engine EG is a prime mover (a gasoline engine, a diesel engine, etc.) that is driven by fuel combustion inside the engine to take out power. The input member 31 is formed of, for example, a shaft member (input shaft). The input member 31 is drive-coupled to an internal combustion engine output member (a crankshaft, etc.) which is an output member of the internal combustion engine EG, such that they rotate together. The input member 31 and the internal combustion engine output member may be directly coupled together, or may be coupled together via another member such as a damper. The input member 31 is drive-coupled to the rotating electrical machine 33 via the disconnection engagement device 32.

The disconnection engagement device 32 selectively couples the input member 31 to the rotating electrical machine 33. In other words, the disconnection engagement device 32 is provided so as to be able to release coupling between the internal combustion engine EG and the rotating electrical machine 33. The disconnection engagement device 32 functions as an internal combustion engine disconnection engagement device that disconnects the internal combustion engine EG from the first wheels W1. The disconnection engagement device 32 is a hydraulically actuated friction engagement device, and for example, a multi-plate wet clutch, etc., can be used.

The rotating electrical machine 33 includes a stator fixed to a case (not shown) which is a non-rotating member; and a rotor which is rotationally supported on a radial inner side of the stator. The rotating electrical machine 33 performs motoring by receiving electric power supply from an electrical storage device (not shown), or supplies and stores electric power generated by the torque of the internal combustion engine EG, the inertia force of the vehicle V, etc., in the electrical storage device. The rotor of the rotating electrical machine 33 is coupled to the transmission input member 34 such that they rotate together. The transmission input member 34 is formed of, for example, a shaft member (transmission input shaft). The transmission input member 34 is drive-coupled to the automatic transmission 35.

Figures 3, 4:
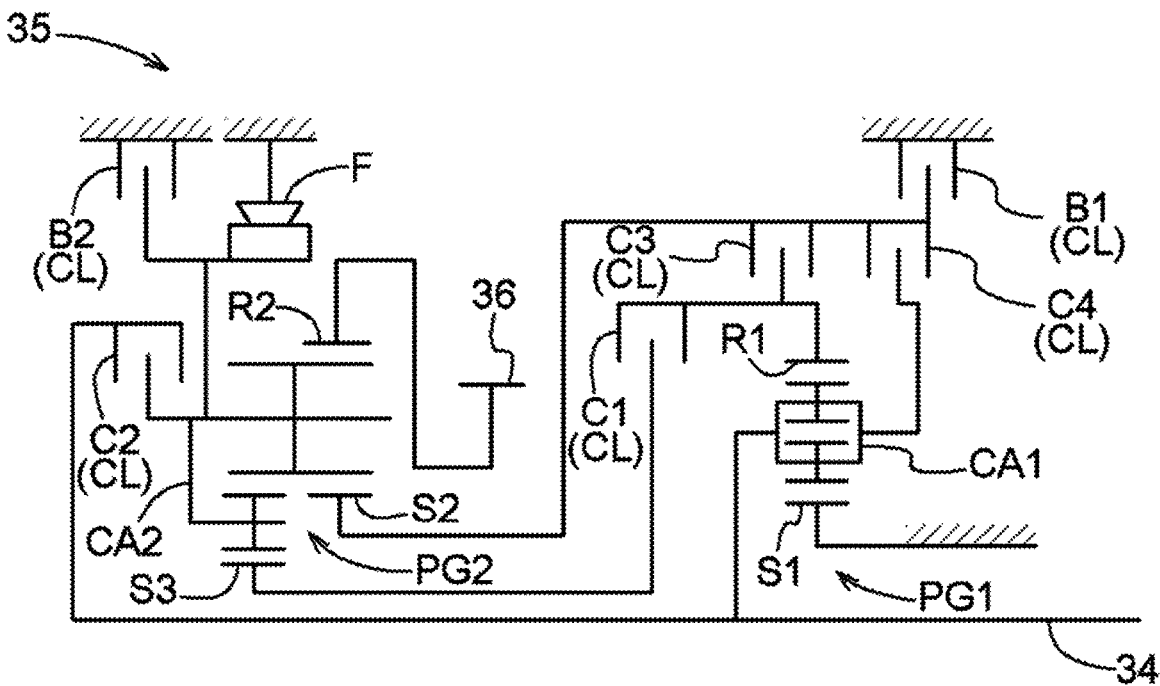
FIG. 3 is a schematic diagram of an automatic transmission.
FIG. 4 is an engagement table for the automatic transmission.

The automatic transmission 35 is formed as a stepped automatic transmission. As shown in FIG. 3, the automatic transmission 35 includes a first planetary gear mechanism PG1, a second planetary gear mechanism PG2, and a plurality of transmission engagement devices CL. The first planetary gear mechanism PG1 is of a double-pinion type, and includes three rotating elements, a sun gear S1, a carrier CA1 and a ring gear R1. The second planetary gear mechanism PG2 is of a Ravigneaux type, and includes four rotating elements, a first sun gear S2, a second sun gear S3, a common carrier CA2, and a common ring gear R2.

The transmission engagement devices CL include a first clutch C1 to a fourth clutch C4, a first brake B1, and a second brake B2. In the present embodiment, the clutches C1 to C4 and the brakes B1 and B2 included in the transmission engagement devices CL are hydraulically actuated friction engagement devices, and for example, multi-plate wet clutches, multiplate wet brakes, etc., can be used. In addition, the automatic transmission 35 further includes a one-way clutch F in addition to the plurality of transmission engagement devices CL. The one-way clutch F is provided to allow positive rotation of the common carrier CA2 with respect to a case (not shown) which is a non-rotating member, and restrict negative rotation. In the present embodiment, the one-way clutch F corresponds to a "one-direction engagement device".

The automatic transmission 35 can selectively form any of a plurality of shift speeds, according to the state of engagement of each of the transmission engagement devices CL and the one-way clutch F (which may be simply referred to as "transmission engagement devices CL" in the following). The automatic transmission 35 selectively places any two of the plurality of transmission engagement devices CL in an engaged state, and thereby forms a shift speed according to a combination of the engaged transmission engagement devices CL.

Specifically, as shown in FIG. 4, first gear (1st) is formed in an engaged state of the first clutch C1 and the one-way clutch F. Second gear (2nd) is formed in an engaged state of the first clutch C1 and the first brake B1. Third gear (3rd) is formed in an engaged state of the first clutch C1 and the third clutch C3. Fourth gear (4th) is formed in an engaged state of the first clutch C1 and the fourth clutch C4. Fifth gear (5th) is formed in an engaged state of the first clutch C1 and the second clutch C2. Sixth gear (6th) is formed in an engaged state of the second clutch C2 and the fourth clutch C4. Seventh gear (7th) is formed in an engaged state of the second clutch C2 and the third clutch C3. Eighth gear (8th) is formed in an engaged state of the second clutch C2 and the first brake B1. Low reverse gear (Rev1) is formed in an engaged state of the third clutch C3 and the second brake B2. High reverse gear (Rev2) is formed in an engaged state of the fourth clutch C4 and the second brake B2.

Note that neutral gear (N) is formed in a disengaged state of all transmission engagement devices CL. In a state in which the neutral gear (N) is formed, the automatic transmission 35 is in a neutral state in which power is not transmitted. When a shift lever of the vehicle is in N range or P range, neural gear (N) is formed and the automatic transmission 35 goes into a neutral state.

The automatic transmission 35 changes the rotational speed of the transmission input member 34 based on a gear ratio determined according to a formed shift speed, and transmits the rotational speed to the transmission output member 36. Note that the "gear ratio" is the ratio of the rotational speed of the transmission input member 34 to the rotational speed of the transmission output member 36, and is calculated as a value obtained by dividing the rotational speed of the transmission input member 34 by the rotational speed of the output members 39. The transmission output member 36 is formed of, for example, a gear member (output gear).

The transmission output member 36 is drive-coupled to the pair of left and right output members 39 via the counter gear mechanism 37 and the differential gear device 38, and is further drive-coupled to the pair of left and right first wheels W1. By this, the vehicle drive device 3 can allow the vehicle V to travel by transmitting torque of one or both of the internal combustion engine EG and the rotating electrical machine 33 to the first wheels W1.

Figure 5:
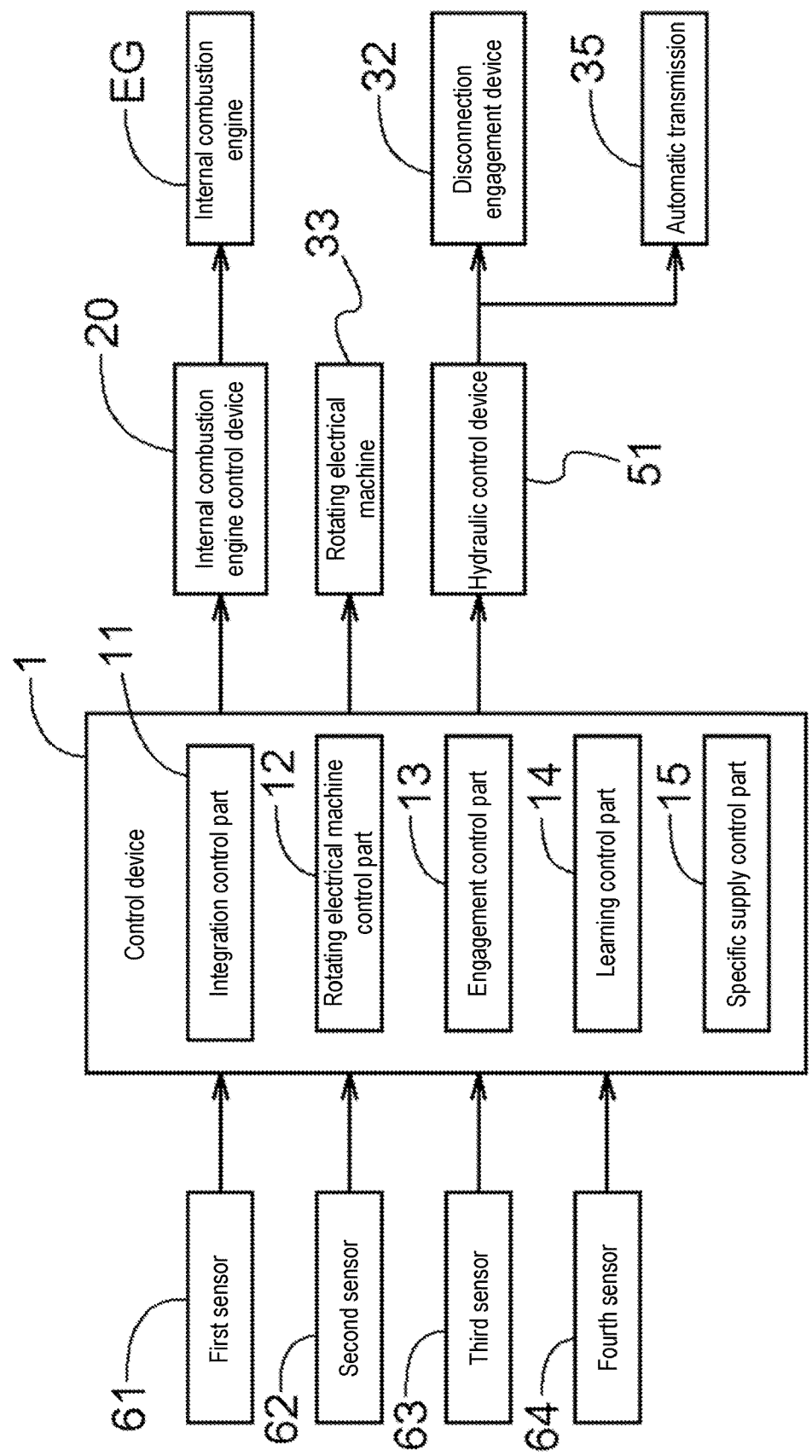
FIG. 5 is a block diagram of a control device.

The control device 1 that functions as the core to perform operation control of each part of the vehicle drive device 3 includes, as shown in FIG. 5, an integration control part 11, a rotating electrical machine control part 12, an engagement control part 13, a learning control part 14, and a specific supply control part 15. Each of these functional parts is formed of software (program) stored in a storage medium such as a memory, or separately provided hardware such as an arithmetic circuit, or both of them. The functional parts are configured to be able to pass information to each other. In addition, the control device 1 is configured to be able to obtain information on results of detection by various types of sensors (a first sensor 61 to a fourth sensor 64) provided in parts of the vehicle V having the vehicle drive device 3 mounted thereon.

The first sensor 61 detects the rotational speeds of the input member 31 and a member (e.g., the internal combustion engine EG) that rotates together with the input member 31. The second sensor 62 detects the rotational speeds of the transmission input member 34 and a member (e.g., the rotating electrical machine 33) that rotates together with the transmission input member 34. The third sensor 63 detects the rotational speeds of the output members 39 and members (e.g., the first wheels W1) that rotate together with the output members 39, or the rotational speed of a member (e.g., the transmission output member 36) that rotates in synchronization with the output members 39. The control device 1 can calculate vehicle speed based on results of the detection by the third sensor 63. The fourth sensor 64 detects the amount of pedal operation (the amount of brake operation) on a brake pedal provided on the vehicle V. In addition to those pieces of information, the control device 1 may be configured to be able to obtain, for example, information on accelerator pedal position and the amount of electric power stored in the electrical storage device.

The integration control part 11 performs control to integrate, as the entire vehicle, various types of control (torque control, rotational speed control, engagement control, etc.) performed on the internal combustion engine EG, the rotating electrical machine 33, the disconnection engagement device 32, the automatic transmission 35 (transmission engagement devices CL), and the like. The integration control part 11 calculates vehicle's required torque which is required to drive the vehicle V (first wheels W1), based on sensor detection information (mainly, information on accelerator pedal position and vehicle speed).

In addition, the integration control part 11 determines a travel mode, based on sensor detection information (mainly, information on accelerator pedal position, vehicle speed, and the amount of electric power stored in the electrical storage device). Travel modes that can be selected by the integration control part 11 include electric travel mode and hybrid travel mode. The electric travel mode is a travel mode in which the vehicle V is allowed to travel by transmitting only the torque of the rotating electrical machine 33 to the first wheels W1. The hybrid travel mode is a travel mode in which the vehicle V is allowed to travel by transmitting the torque of both the internal combustion engine EG and the rotating electrical machine 33 to the first wheels W1. In addition, in the present embodiment, the integration control part 11 can also select vehicle-stop charging mode in addition to the electric travel mode and the hybrid travel mode. The vehicle-stop charging mode is a mode in which the electrical storage device is charged by allowing the rotating electrical machine 33 to generate electric power by torque of the internal combustion engine EG during vehicle stop.

The integration control part 11 determines output torque (internal combustion engine's required torque) which is requested to the internal combustion engine EG and output torque (rotating electrical machine's required torque) which is requested to the rotating electrical machine 33, based on a determined travel mode, sensor detection information, etc. In addition, the integration control part 11 determines the state of engagement of the disconnection engagement device 32 and a target shift speed to be formed by the automatic transmission 35, based on a determined travel mode, sensor detection information, etc.

In the present embodiment, the control device 1 (integration control part 11) controls the internal combustion engine EG via an internal combustion engine control device 20.

The rotating electrical machine control part 12 controls the rotating electrical machine 33. The rotating electrical machine control part 12 can switch between torque control and rotational speed control of the rotating electrical machine 33, according to the travel state of the vehicle V. The torque control of the rotating electrical machine 33 is control in which target torque is instructed to the rotating electrical machine 33 to allow the output torque of the rotating electrical machine 33 to follow the target torque. The rotational speed control of the rotating electrical machine 33 is control in which a target rotational speed is instructed to the rotating electrical machine 33 to allow the rotational speed of the rotating electrical machine 33 to follow the target rotational speed.

The engagement control part 13 controls the state of engagement of the disconnection engagement device 32 and the state of engagement of the plurality of transmission engagement devices CL included in the automatic transmission 35. The engagement control part 13 controls the state of engagement of the disconnection engagement device 32 so as to form a travel mode determined by the integration control part 11. The engagement control part 13, for example, controls the disconnection engagement device 32 to a disengaged state when electric travel mode is formed, and controls the disconnection engagement device 32 to an engaged state when hybrid travel mode is formed. In addition, the engagement control part 13 controls the state of engagement of each of the plurality of transmission engagement devices CL so as to form a target shift speed determined by the integration control part 11. The engagement control part 13 controls two transmission engagement devices CL determined according to a target shift speed to an engaged state, and controls all other transmission engagement devices CL to a disengaged state (see FIG. 4).

A hydraulic control device 51 includes a hydraulic control valve (a linear solenoid valve, etc.) for adjusting the hydraulic pressure of hydraulic oil supplied from an oil pump (not shown). The hydraulic control device 51 adjusts the degree of opening of the hydraulic control valve in accordance with a hydraulic pressure instruction C transmitted from the engagement control part 13, and thereby supplies hydraulic oil at a hydraulic pressure determined in accordance with the hydraulic pressure instruction C to each engagement device.

Figure 6:
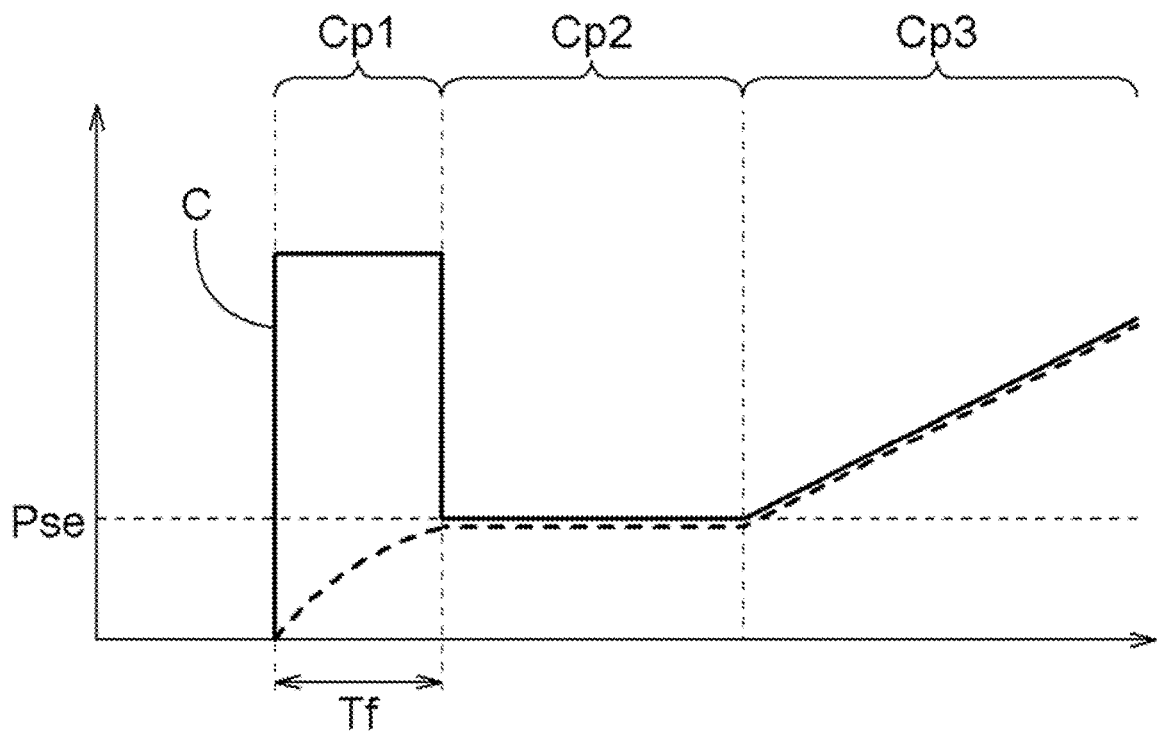
FIG. 6 is a schematic diagram of a hydraulic pressure instruction.

As shown in FIG. 6, the hydraulic pressure instruction C includes a first phase instruction Cp1 that allows the hydraulic control valve to be fully opened at an initial stage; a second phase instruction Cp2 that allows the hydraulic control valve to maintain a predetermined degree of opening; and a third phase instruction Cp3 that allows the degree of opening of the hydraulic control valve to gradually increase. In accordance with the first phase instruction Cp1, pressure oil is rapidly pumped into an engagement operating part (specifically, in a hydraulic cylinder), by which clearance between a plurality of friction plates is eliminated and so-called backlash elimination is performed. In accordance with the second phase instruction Cp2, the hydraulic pressure of the oil supplied to the engagement operating part is maintained at a predetermined pressure (specifically, a stroke end pressure Pse obtained immediately before an engagement device to be engaged starts to have torque capacity). In accordance with the third phase instruction Cp3, the hydraulic pressure of the oil supplied to the engagement operating part gradually increases.

As indicated by a broken line in FIG. 6, the actual hydraulic pressure gradually increases during a fast fill period Tf corresponding to the period of the first phase instruction Cp1, and reaches the stroke end pressure Pse at some point in time during the period of the second phase instruction Cp2. At this time, the time taken from when a hydraulic pressure instruction C is outputted to a given engagement device until the engagement device actually starts to have torque capacity can vary from engagement device to engagement device, and can change over time even for the same engagement device. In addition, the stroke end pressure Pse itself which is a target value in the second phase instruction Cp2 can also vary from engagement device to engagement device, and can change over time even for the same engagement device.

The learning control part 14 performs, for each engagement device, learning control in which at least engagement start timing is learned. The engagement start timing is learned as, for example, the time taken from when a hydraulic pressure instruction C is outputted to a given engagement device until the engagement device actually starts to have torque capacity. The engagement start timing may be determined based on the time elapsed from the output of a hydraulic pressure instruction C, or when the fast fill period Tf is fixed, the engagement start timing may be determined based on the time elapsed from the end of the fast fill period Tf. In addition, the learning control part 14 of the present embodiment is configured to learn, in learning control, engagement start hydraulic pressure (stroke end pressure Pse) in addition to engagement start timing. The learning control part 14 detects engagement start timing and engagement start hydraulic pressure, and when they are out of their predetermined proper ranges, the learning control part 14 learns and corrects them so as to approach the proper ranges.

The learning control part 14 performs learning control, for example, when a shift operation from N range to D range is performed during the operation of the internal combustion engine EG (upon N D shifting) or when a shift operation from N range to R range is performed (upon N R shifting). For example, upon N D shifting, learning control is performed targeting the first clutch C1 which is one of the plurality of transmission engagement devices CL and which is placed in an engaged state to form first gear (1st). In addition, upon N R shifting, learning control is performed targeting the second brake B2 which is one of the plurality of transmission engagement devices CL and which is placed in an engaged state to form low reverse gear (Rev1). However, the use of only the above-described learning control limits learning opportunities, and thus, the control device 1 of the present embodiment is configured to be able to perform specific supply control such as that described below to increase learning opportunities.

The specific supply control part 15 performs specific supply control in which the rotating electrical machine 33 is driven in a neutral state, and hydraulic pressure is supplied to an engagement operating part of a target engagement device CLt which is one of the plurality of transmission engagement devices CL, with the rotating electrical machine 33 being driven. At this time, in the present embodiment, the specific supply control part 15 does not supply hydraulic pressure to engagement operating parts of remaining transmission engagement devices CL other than the target engagement device CLt.

It is preferred that the target engagement device CLt be one of transmission engagement devices CL that are engaged to form a target shift speed at that point in time. For example, upon N D shifting, since first gear (1st) is typically set as a target shift speed, the target engagement device CLt is the first clutch C1 which is placed in an engagement state to form first gear (1st). In addition, for example, upon N R shifting, since low reverse gear (Rev1) is typically set as a target shift speed, the target engagement device CLt is one of the third clutch C3 and the second brake B2 (e.g., the second brake B2) which are placed in an engagement state to form low reverse gear (Rev1).

The specific supply control part 15 purposely drives the rotating electrical machine 33 even when the automatic transmission 35 is in a neutral state during vehicle stop and the vehicle V is maintained in a vehicle stop state, and performs specific supply control in that state. Then, based on behavior occurring in a target engagement device CLt by performing the specific supply control, the learning control part 14 performs learning control targeting the target engagement device CLt.

Figure 7:
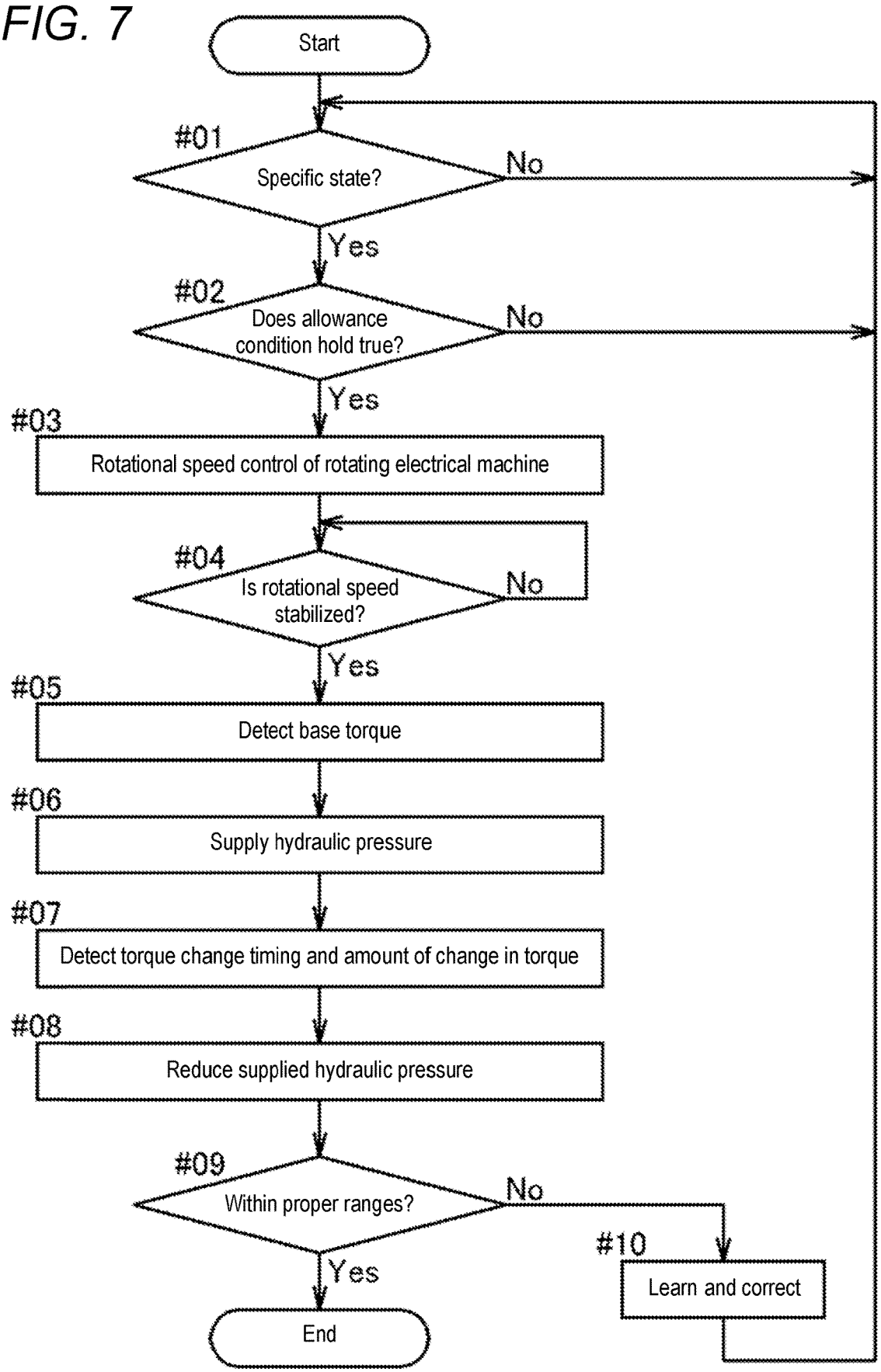
FIG. 7 is a flowchart showing a processing procedure of specific supply control and learning control.
Figure 8:
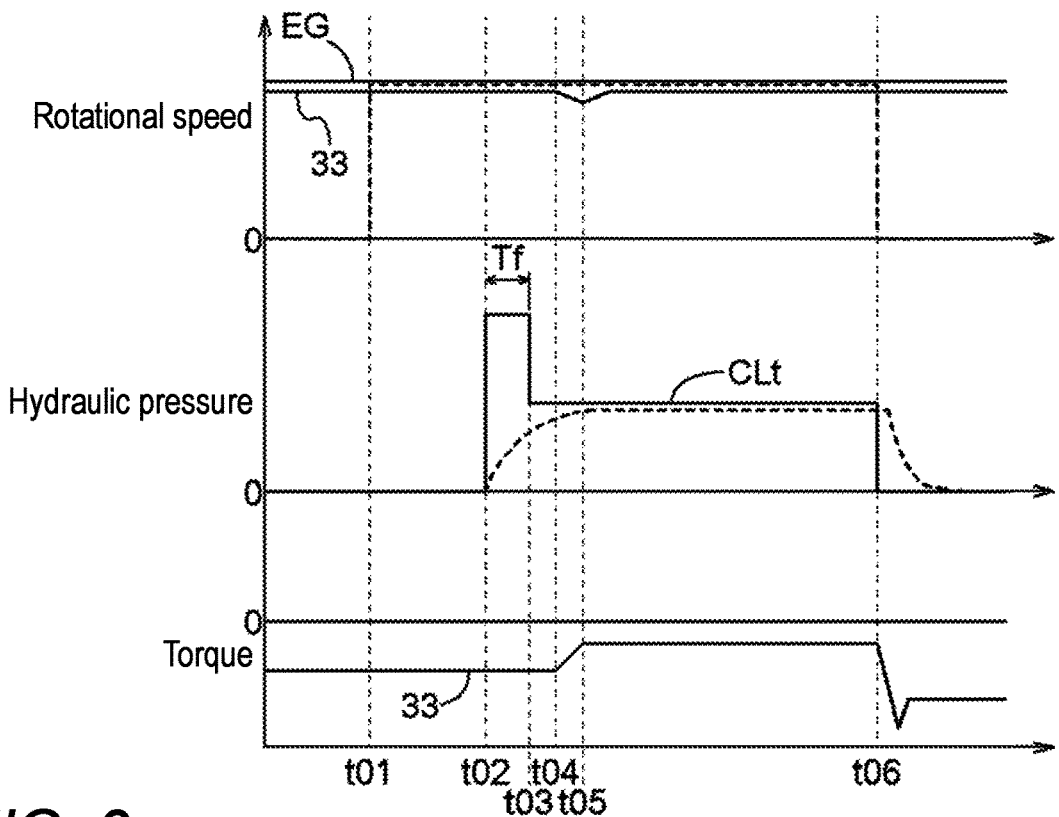
FIG. 8 is a time chart for the specific supply control and the learning control.

The details of processes for specific supply control and learning control which are performed using the specific supply control part 15 and the learning control part 14 as the core will be described below with reference to FIGS. 7 and 8. Note that the following assumes an example in which the first clutch C1 is a target engagement device CLt. First, it is determined whether a state at that point in time is a specific state (step #01). In the present embodiment, a state in which the rotating electrical machine 33 generates electric power while rotating together with the internal combustion engine EG in a neutral state during vehicle stop is the specific state. A determination as to whether a state is the specific state can be made, for example, based on whether a travel mode at that point in time is vehicle-stop charging mode.

If it is determined that the state is the specific state (#01: Yes), then it is determined whether an allowance condition holds true (#02). In the present embodiment, the allowance condition is that the amount of pedal operation (the amount of brake operation) on the brake pedal provided on the vehicle V is greater than or equal to a predetermined reference amount of operation. Note that the amount of pedal operation (the amount of brake operation) on the brake pedal can be obtained from a result of detection by the fourth sensor 64. In a case in which, as in this example, the first clutch C1 is a target engagement device CLt, when the target engagement device CLt (first clutch C1) is engaged, first gear (1st) is actually formed in cooperation with the one-way clutch F.

Hence, it is configured such that only when a pedal operation of a predetermined amount or more is performed on the brake pedal of the vehicle V, it is determined that the allowance condition holds true (#02: Yes), and subsequent specific supply control and learning control are performed. This can avoid a situation in which when specific supply control and learning control are performed, the vehicle V starts against a driver's intention. Note that the reference amount of operation for the amount of brake operation which is a criterion for whether the allowance condition holds true may vary depending on the road gradient. For example, the reference amount of operation for the amount of brake operation may be set to increase continuously or stepwise as a downward gradient of a road on which the vehicle V is stopped increases (as an upward gradient decreases).

If it is determined that the allowance condition holds true in the specific state (#01: Yes and #02: Yes), specific supply control and learning control start. In the present embodiment, as part of specific supply control, rotational speed control of the rotating electrical machine 33 is performed (#03 and time t01). In the rotational speed control of the rotating electrical machine 33, a target rotational speed (indicated by a broken line in FIG. 8) is set to the rotational speeds of the internal combustion engine EG and the rotating electrical machine 33 obtained therebefore during charging. Then, after a lapse of a predetermined time, it is determined whether the actual rotational speed of the rotating electrical machine 33 is stabilized (#04). In this example, since the target rotational speed of the rotating electrical machine 33 is set to a rotational speed obtained therebefore, in practice, an affirmative determination is made at step #04.

When stabilization of the actual rotational speed of the rotating electrical machine 33 is confirmed, output torque of the rotating electrical machine 33 at that time is detected as base torque (#05). In the present embodiment, the base torque is negative torque (charging torque) outputted from the rotating electrical machine 33 that is in the process of generating electric power.

When the base torque is confirmed, then supply of hydraulic pressure to an engagement operating part of the target engagement device CLt starts (#06 and t02). Namely, while the rotational speed control of the rotating electrical machine 33 is performed, hydraulic pressure is supplied to the engagement operating part of the target engagement device CLt. In the present embodiment, hydraulic pressure is supplied in accordance with the first phase instruction Cp1 and the second phase instruction Cp2 (see FIG. 6) of the above-described hydraulic pressure instruction C. By doing so, the actual hydraulic pressure acting on the engagement operating part gradually increases, and the target engagement device CLt actually starts to have transmission torque capacity at predetermined timing (t04) after a lapse of a fast fill period Tf (t02 to t03).

At this time, by the target engagement device CLt starting to have transmission torque capacity, the rotational speed of the transmission input member 34 is reduced, and accordingly, the actual rotational speed of the rotating electrical machine 33 decreases (t04 to t05). Consequently, in the rotational speed control of the rotating electrical machine 33, the output torque of the rotating electrical machine 33 changes so as to cancel out a deviation between the target rotational speed and the actual rotational speed. In this example, the output torque of the rotating electrical machine 33 increases, and the negative torque for charging decreases with reference to an absolute value. The torque change timing and the amount of change in torque of the rotating electrical machine 33 at this time are detected (#07). The torque change timing can be detected, for example, as time elapsed from when the fast fill period Tf ends (t03), using an internal timer, etc. The amount of change in torque can be detected by feedback torque in the rotational speed control of the rotating electrical machine 33.

When the torque change timing and the amount of change in torque are detected, thereafter, the supplied hydraulic pressure is reduced at appropriate timing (#08 and t06). In the case of normal N D shifting, thereafter, the target engagement device CLt (first clutch C1) is further engaged, whereas in the specific supply control of the present embodiment, the target engagement device CLt is disengaged again, in which point they greatly differ from each other.

In addition, it is determined whether each of the detected torque change timing and amount of change in torque falls within its predetermined proper range (#09). If it is determined that any of them does not fall within its proper range (#09: No), a correction is made to approach the proper range (#10). For example, when the torque change timing is excessively early, a correction is made to shorten the fast fill period Tf by a predetermined unit time $\Delta T$. Alternatively, when the torque change timing is excessively slow, a correction is made to lengthen the fast fill period Tf by a predetermined unit time $\Delta T$. In addition, for example, when the amount of change in torque is excessively large, a correction is made to reduce the target value of the stroke end pressure Pse by predetermined unit hydraulic pressure $\Delta P$. Alternatively, when the amount of change in torque is excessively small, a correction is made to increase the target value of the stroke end pressure Pse by predetermined unit hydraulic pressure $\Delta P$.

Each of the above-described processes is repeatedly performed until it is determined at step #09 that both the torque change timing and the amount of change in torque converge within their proper ranges (#09: Yes). In this manner, in the present embodiment, changes in the torque of the rotating electrical machine 33 after supplying hydraulic pressure to the engagement operating part of the target engagement device CLt are detected, and the engagement start timing and engagement start hydraulic pressure of the target engagement device CLt are learned based on results of the detection. Specifically, as the changes in the torque of the rotating electrical machine 33, the change start timing of and the amount of change in feedback torque in the rotational speed control are detected, and the engagement start timing and engagement start hydraulic pressure of the target engagement device CLt are learned based on results of the detection.

In the present embodiment, not only upon normal N D shifting or N R shifting during operation of the internal combustion engine EG, but also in a state in which the rotating electrical machine 33 generates electric power in a neutral state during vehicle stop, learning opportunities for response characteristics of a target engagement device CLt are created by performing specific supply control. As such, by intentionally creating learning opportunities even in a situation in which there are normally no transmission opportunities, response characteristics of the target engagement device CLt can be learned with high accuracy in a short period of time.

Note that the vehicle V with specifications in which the automatic transmission 35 is placed in a neutral state during performance of vehicle-stop charging mode can start off from the neutral state and perform specific supply control and learning control of the present embodiment. The vehicle V with such specifications does not need to be placed in a neutral state to perform specific supply control and learning control which are specific to the present embodiment, and an additional hesitation problem does not occur.

Second Embodiment

A second embodiment of a control device will be described with reference to the drawings. In the present embodiment, a start state for when specific supply control and learning control are performed differs from that of the first embodiment. The control device 1 of the present embodiment will be described below mainly about differences from the first embodiment. Note that matters that are not specifically stated are the same as those of the first embodiment, and thus are denoted by the same reference signs and a detailed description thereof is omitted.

Figure 9:
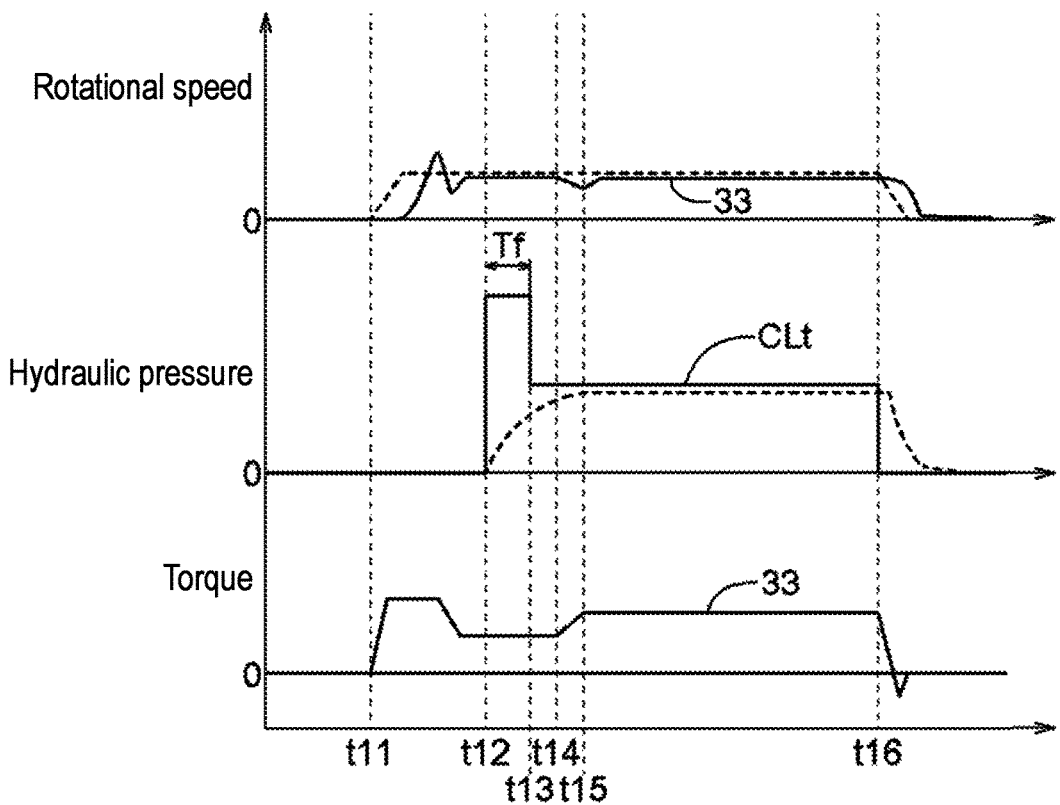
FIG. 9 is a time chart for specific supply control and learning control of a second embodiment.

In the present embodiment, in a determination as to whether a state at that point in time is a specific state (see step #01 of FIG. 7), a state in which the rotating electrical machine 33 is stopped in a neutral state during vehicle stop is the specific state. When it is determined that the state is the specific state and it is determined that an allowance condition about the amount of brake operation holds true, as shown in FIG. 9, rotational speed control of the rotating electrical machine 33 starts from that state (time t11). When the rotational speed of the rotating electrical machine 33 follows a target rotational speed (indicated by a broken line in FIG. 9) and is stabilized, output torque of the rotating electrical machine 33 at that time is detected as base torque, and thereafter, supply of hydraulic pressure to an engagement operating part of a target engagement device CLt starts (t12).

By doing so, the actual hydraulic pressure acting on the engagement operating part of the target engagement device CLt gradually increases, and the target engagement device CLt actually starts to have transmission torque capacity at predetermined timing (t14) after a lapse of a fast fill period Tf (t12 to t13). At this time, by the target engagement device CLt starting to have transmission torque capacity, the rotational speed of the transmission input member 34 is reduced, and accordingly, the actual rotational speed of the rotating electrical machine 33 decreases (t14 to t15). Consequently, in the rotational speed control of the rotating electrical machine 33, the output torque of the rotating electrical machine 33 increases so as to cancel out a deviation between the target rotational speed and the actual rotational speed. The torque change timing and the amount of change in torque of the rotating electrical machine 33 at this time are detected. When the torque change timing and the amount of change in torque are detected, thereafter, the supplied hydraulic pressure is reduced at appropriate timing (t16), and the torque change timing and the amount of change in torque are corrected as necessary.

In the present embodiment, not only upon normal N D shifting or N R shifting during operation of the internal combustion engine EG, but also in a state in which the rotating electrical machine 33 is stopped in a neutral state during vehicle stop, learning opportunities for response characteristics of a target engagement device CLt are created by performing specific supply control. As such, by intentionally creating learning opportunities even in a situation in which there are normally no transmission opportunities, response characteristics of the target engagement device CLt can be learned with high accuracy in a short period of time.

Third Embodiment

A third embodiment of a control device will be described with reference to the drawing. In the present embodiment, the configuration of the vehicle drive device 3 which is a control target, and a start state for when specific supply control and learning control are performed and an allowance condition for that case differ from those of the first embodiment and the second embodiment. The control device 1 of the present embodiment will be described below mainly about differences from the first embodiment. Note that matters that are not specifically stated are the same as those of the first embodiment, and thus are denoted by the same reference signs and a detailed description thereof is omitted.

Figure 10:
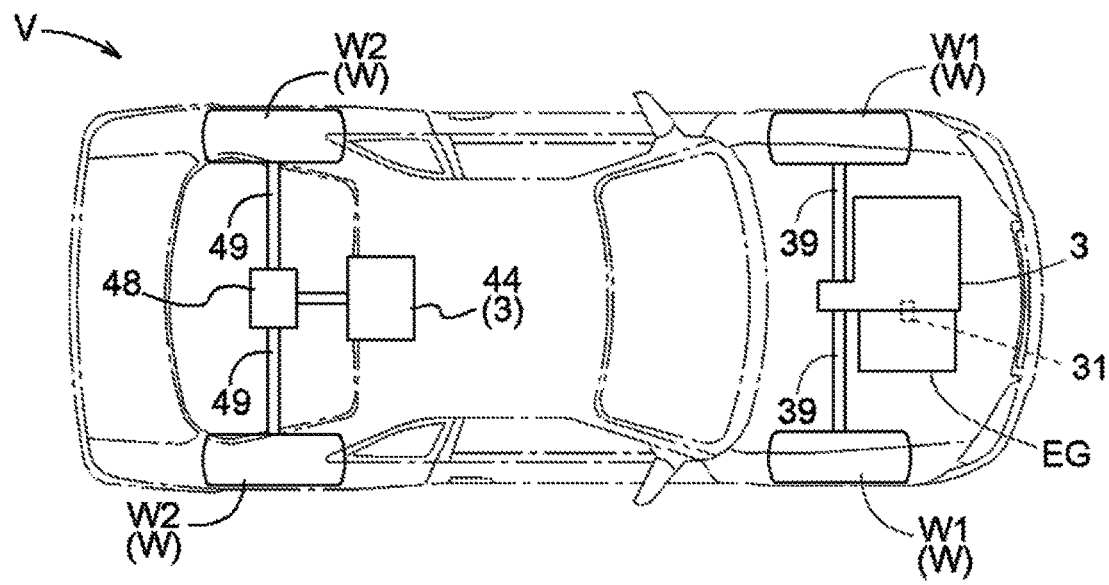
FIG. 10 is a schematic diagram of a vehicle having a vehicle drive device of a third embodiment mounted thereon.

In the present embodiment, as shown in FIG. 10, the vehicle drive device 3 which is a control target of the control device 1 is provided with a second rotating electrical machine 44 so that drive power can be transmitted to second wheels W2 which are independent of the internal combustion engine EG and the rotating electrical machine 33. For example, the first wheels W1 are front wheels of the vehicle V, and the second wheels W2 are rear wheels of the vehicle V. The second rotating electrical machine 44 is drive-coupled to a pair of left and right second output members 49 via a second differential gear device 48, and is further drive-coupled to the pair of left and right second wheels W2. The second rotating electrical machine 44 functions as a drive power source of the vehicle V (wheels W) with the internal combustion engine EG which is a first drive power source and the rotating electrical machine 33 which is a second drive power source. In the present embodiment, the second rotating electrical machine 44 corresponds to an "another drive power source". Note that the internal combustion engine EG which is the first drive power source, the rotating electrical machine 33 which is the second drive power source, and the second rotating electrical machine 44 which is the "another drive power source" can be referred to as "first drive power source", "second drive power source", and "third drive power source", respectively.

The vehicle V of the present embodiment can travel by torque of one or both of the internal combustion engine EG and the rotating electrical machine 33 which is transmitted to the first wheels W1 (electric travel front-wheel drive mode or hybrid travel mode) as in the first embodiment, and can also travel by torque of the second rotating electrical machine 44 which is transmitted to the second wheels W2 (electric travel rear-wheel drive mode). In addition, the vehicle V can also travel by both of torque of one or both of the internal combustion engine EG and the rotating electrical machine 33 which is transmitted to the first wheels W1 and torque of the second rotating electrical machine 44 which is transmitted to the second wheels W2 (four-wheel drive mode).

In the present embodiment, in a determination as to whether a state at that point in time is a specific state (see step #01 of FIG. 7), a state in which the vehicle V is traveling by torque of the second rotating electrical machine 44 which is transmitted to the second wheels W2 and the rotating electrical machine 33 is stopped in a neutral state is the specific state. A determination as to whether a state is the specific state can be made, for example, based on whether a travel mode at that point in time is electric travel rear-wheel drive mode.

Figure 12:
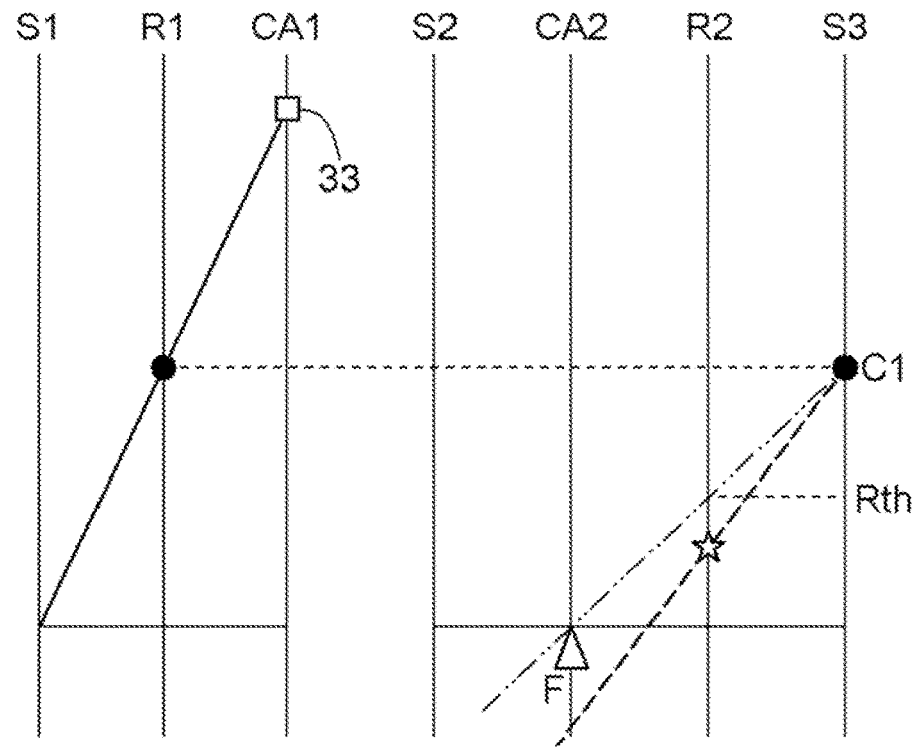
FIG. 12 is a speed diagram showing a state of the automatic transmission for when an allowance condition does not hold true.
Figure 13:
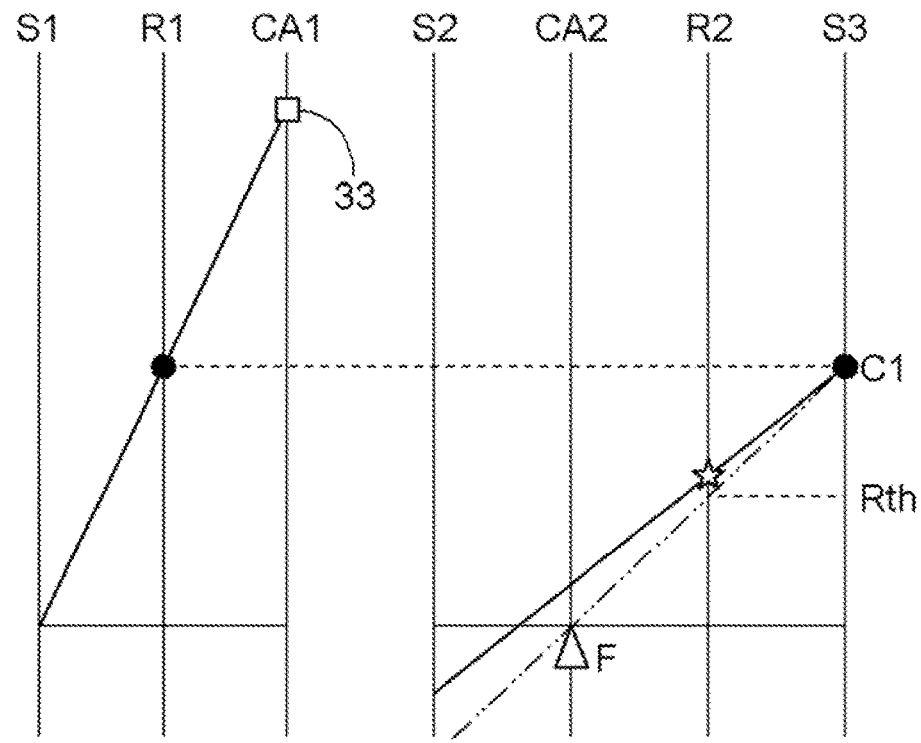
FIG. 13 is a speed diagram showing a state of the automatic transmission for when the allowance condition holds true.

In addition, in the present embodiment, in a determination as to whether specific supply control and learning control can be performed, an allowance condition is that the vehicle is traveling in a vehicle speed range in which even if a target engagement device CLt is engaged, the one-way clutch F is maintained in an unengaged state. In a case in which the rotating electrical machine 33 is driven later, when, for example, as shown in FIG. 12, the target engagement device CLt is engaged upon low-speed traveling of the vehicle V, the common carrier CA2 of the second planetary gear mechanism PG2 goes into a negative rotation state under ordinary circumstances (see a broken-line bar indicating an imaginary rotation state). In that case, however, in the automatic transmission 35, the one-way clutch F is engaged, forming first gear (1st). Hence, in the present embodiment, it is configured such that only during traveling of the vehicle in a vehicle speed range (allowed vehicle speed range) in which as shown in FIG. 13, even if the target engagement device CLt is engaged, the one-way clutch F is maintained in an unengaged state, it is determined that the allowance condition holds true, and subsequent specific supply control and learning control are performed. This can avoid a situation in which when specific supply control and learning control are performed, the vehicle V accelerates against a driver's intention.

Note that the allowed vehicle speed range is a speed range higher than or equal to a vehicle speed determined according to the rotational speed of the common ring gear R2 (indicated by "Rth" in FIG. 13) obtained when the rotational speeds of the ring gear R1 and the second sun gear S3 are determined according to a target rotational speed of the rotating electrical machine 33 and the rotational speed of the common carrier CA2 is zero.

Figure 11:
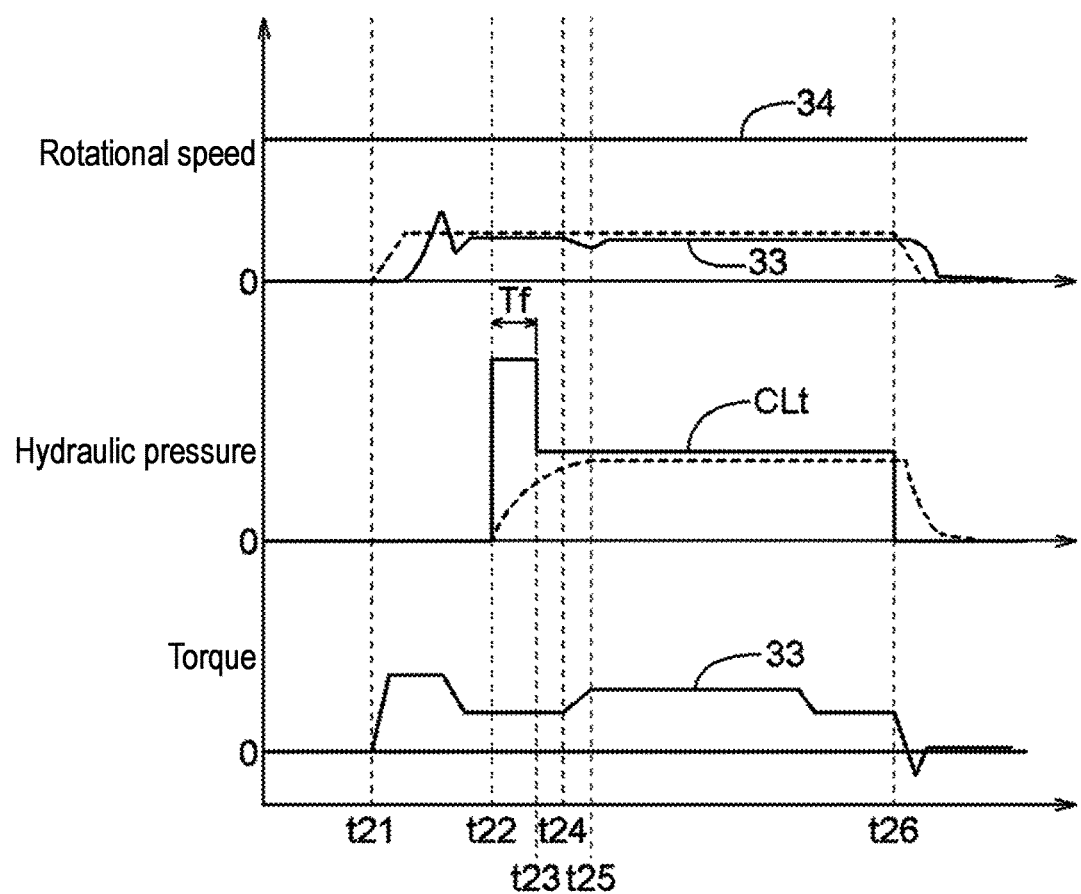
FIG. 11 is a time chart for specific supply control and learning control.

When it is determined that the state is the specific state and it is determined that the allowance condition about vehicle speed holds true, as shown in FIG. 11, rotational speed control of the rotating electrical machine 33 starts from that state (time t21). When the rotational speed of the rotating electrical machine 33 follows a target rotational speed (indicated by a broken line in FIG. 11) and is stabilized, output torque of the rotating electrical machine 33 at that time is detected as base torque, and thereafter, supply of hydraulic pressure to an engagement operating part of the target engagement device CLt starts (t22).

By doing so, the actual hydraulic pressure acting on the engagement operating part of the target engagement device CLt gradually increases, and the target engagement device CLt actually starts to have transmission torque capacity at predetermined timing (t24) after a lapse of a fast fill period Tf (t22 to t23). At this time, by the target engagement device CLt starting to have transmission torque capacity, the rotational speed of the transmission input member 34 is reduced, and accordingly, the actual rotational speed of the rotating electrical machine 33 decreases (t24 to t25). Consequently, in the rotational speed control of the rotating electrical machine 33, the output torque of the rotating electrical machine 33 increases so as to cancel out a deviation between the target rotational speed and the actual rotational speed. The torque change timing and the amount of change in torque of the rotating electrical machine 33 at this time are detected. When the torque change timing and the amount of change in torque are detected, thereafter, the supplied hydraulic pressure is reduced at appropriate timing (t26), and the torque change timing and the amount of change in torque are corrected as necessary.

In the present embodiment, not only upon normal N D shifting or N R shifting during operation of the internal combustion engine EG, but also in a state in which the rotating electrical machine 33 is stopped in a neutral state and the vehicle V is traveling in electric travel rear-wheel drive mode, learning opportunities for response characteristics of a target engagement device CLt are created by performing specific supply control. As such, by intentionally creating learning opportunities even in a situation in which there are normally no transmission opportunities, response characteristics of the target engagement device CLt can be learned with high accuracy in a short period of time.

Fourth Embodiment

A fourth embodiment of a control device will be described with reference to the drawings. In the present embodiment, specific operations of specific supply control and learning control differ from those of each of the above-described embodiments. The control device 1 of the present embodiment will be described below mainly about differences from the second embodiment. Note that matters that are not specifically stated are the same as those of the second embodiment, and thus are denoted by the same reference signs and a detailed description thereof is omitted.

In the present embodiment, in specific supply control, the specific supply control part 15 supplies hydraulic pressure to an engagement operating part of a target engagement device CLt, with hydraulic pressure being supplied to an engagement operating part of one of transmission engagement devices CL (hereinafter, referred to as "specific engagement device CLs") other than the target engagement device CLt. It is preferred that the specific engagement device CLs be one of transmission engagement devices CL that are engaged to form a target shift speed at that point in time. As described above, it is preferred that the target engagement device CLt be also one of the transmission engagement devices CL that are engaged to form the target shift speed at that point in time. Hence, when a shift speed is formed with two transmission engagement devices CL placed in an engaged state as in the present embodiment, it is preferred that one of two transmission engagement devices CL that are engaged to form a target shift speed be a specific engagement device CLs, and the other be a target engagement device CLt. Note that in a state in which a target shift speed has not been determined, a specific engagement device CLs and a target engagement device CLt may be any transmission engagement device CL.

Hydraulic pressure supplied first to an engagement operating part of a specific engagement device CLs has a magnitude that places the specific engagement device CLs in a complete engaged state. In this case, in specific supply control, the specific supply control part 15 supplies hydraulic pressure to an engagement operating part of a target engagement device CLt, with the specific engagement device CLs being in the complete engaged state. In such a configuration, changes in feedback torque in target rotational speed control of the rotating electrical machine 33 appear with high sensitivity compared to a configuration (the configuration of each of the above-described embodiments) in which all transmission engagement devices CL other than the target engagement device CLt are placed in a disengaged state, and thus, learning accuracy can be improved.

On the other hand, since the specific engagement device CLs is in the complete engaged state in advance, it relatively increases the risk that when hydraulic pressure is supplied to the engagement operating part of the target engagement device CLt, a target shift speed is actually formed, starting the vehicle V against a driver's intention. Hence, in the present embodiment, to avoid the occurrence of such a situation during specific supply control, various measures are taken.

A first measure is specific setting of an allowance condition for starting specific supply control and learning control. As described above, the allowance condition is that the amount of brake operation is greater than or equal to a predetermined reference amount of operation. Namely, in the present embodiment, only when the amount of pedal operation on the brake pedal is greater than or equal to the predetermined reference amount of operation, specific supply control and learning control are performed. In this case, in the present embodiment, the maximum value of drive power that is possibly generated by performing specific supply control is set as potential maximum drive power to be generated, and an amount of brake operation at which the braking torque of the vehicle V is greater than or equal to the potential maximum drive power to be generated is set as the reference amount of operation. Note that the potential maximum drive power to be generated may be found by simulation or may be found experimentally.

Figure 16:
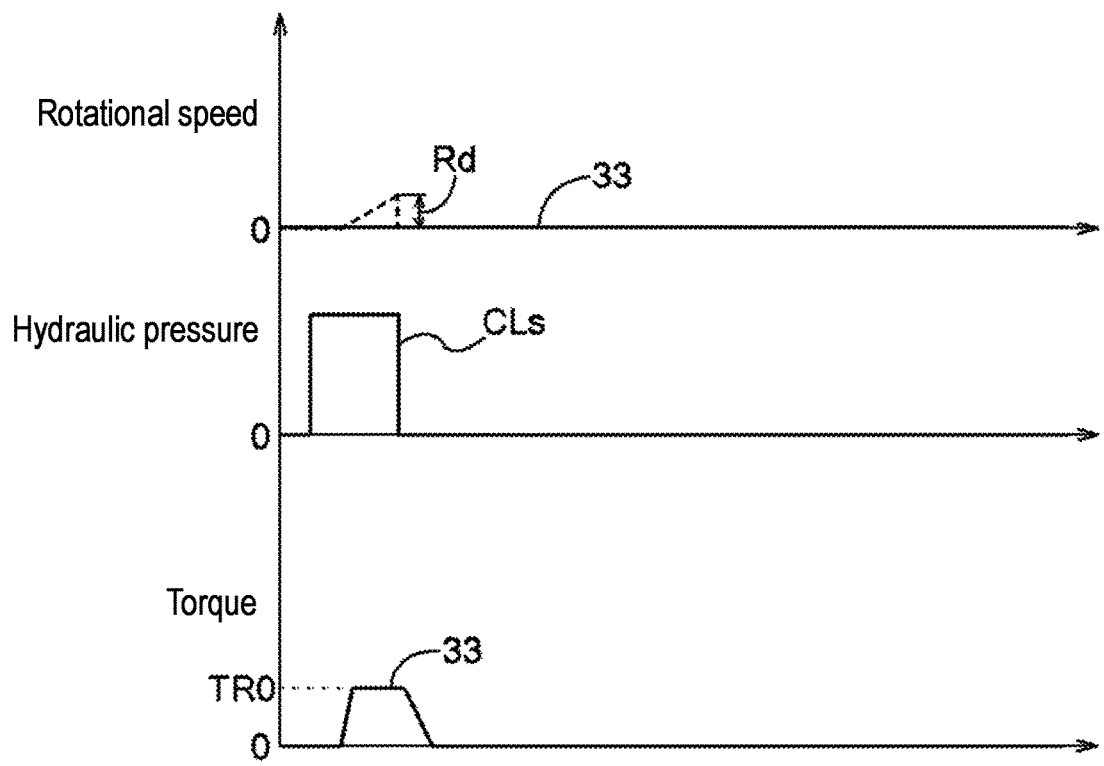
FIG. 16 is an example of a time chart for the specific supply control and the learning control.

A second measure is an early abnormality determination which is made immediately after starting supply of hydraulic pressure to the engagement operating part of the target engagement device CLt. In the present embodiment, as in the second embodiment, in specific supply control, rotational speed control is performed at the start of the specific supply control to increase the rotational speed of the rotating electrical machine 33. At this time, for example, when the target engagement device CLt or a solenoid that controls the target engagement device CLt is physically stuck (hereinafter, referred to as "sticking failure"), a target shift speed is actually formed with the vehicle V being stopped by a brake operation, and as a result, the rotational speed of the rotating electrical machine 33 does not actually increase. Hence, when a difference between the actual rotational speed of the rotating electrical machine 33 and a target rotational speed for rotational speed control of the rotating electrical machine 33 has reached a predetermined reference differential rotational speed Rd (see FIG. 16) within a predetermined time after starting the rotational speed control, the specific supply control part 15 of the present embodiment determines that a sticking failure has occurred. The reference differential rotational speed is set to, for example, a value on the order of 50 to 300 rpm.

In addition, in the rotational speed control of the rotating electrical machine 33, if the actual rotational speed of the rotating electrical machine 33 does not reach the target rotational speed, then feedback torque increases. Hence, when feedback torque has reached a predetermined initial reference torque TR0 (see FIG. 15) within a predetermined time after starting the rotational speed control of the rotating electrical machine 33, too, the specific supply control part 15 of the present embodiment determines that a sticking failure has occurred. Then, when the specific supply control part 15 has detected occurrence of a sticking failure, based on the actual rotational speed or feedback torque of the rotating electrical machine 33, the specific supply control part 15 stops the specific supply control and subsequent learning control. The specific supply control part 15 terminates the specific supply control before starting supply of hydraulic pressure to the engagement operating part of the target engagement device CLt, and does not supply hydraulic pressure to the engagement operating part of the target engagement device CLt.

A third measure is an abnormality determination which is made after performing proper hydraulic pressure supply to the engagement operating part of the target engagement device CLt. In learning control, a correction is made based on the amount of change in torque (the amount of change in feedback torque) obtained after supplying hydraulic pressure to the engagement operating part of the target engagement device CLt with rotational speed control of the rotating electrical machine 33 being performed, so that a target value of stroke end pressure Pse of the target engagement device CLt can approach a proper value. In standard specifications, it is designed such that feedback torque does not get too large. Hence, when the feedback torque in rotational speed control has reached a predetermined first reference torque TR1 (see FIG. 15), the specific supply control part 15 of the present embodiment determines that a detection value is abnormal. The first reference torque TR1 is set to a value near the upper limit of feedback torque that is allowed in learning control for the standard specifications.

When the specific supply control part 15 has detected an abnormality in a detection value based on the feedback torque of the rotating electrical machine 33, the specific supply control part 15 stops the specific supply control and subsequent learning control. At that time, the specific supply control part 15 gradually reduces the supplied hydraulic pressure to the engagement operating part of the target engagement device CLt. With the reduction in the supplied hydraulic pressure, the feedback torque of the rotating electrical machine 33 also gradually decreases. When the feedback torque in the rotational speed control has eventually reached a second reference torque TR2 which is set in advance to a value smaller than the first reference torque TR1, the specific supply control part 15 thereafter terminates the rotational speed control of the rotating electrical machine 33. By thus terminating the rotational speed control after the feedback torque has reached less than or equal to the second reference torque TR2, inertia shock caused by changes in the rotation of each rotating element of the planetary gear mechanisms PG1 and PG2 in the automatic transmission 35 can be suppressed to a small level, and can be desirably avoided. The second reference torque TR2 is set to, for example, a value near feedback torque (base torque)

obtained before supplying hydraulic pressure to the engagement operating part of the target engagement device CLt.

In addition, for example, even if there is no sticking failure at the start of specific supply control and learning control, there is a possibility that a sticking failure may occur during performance of the specific supply control and learning control. Hence, in a case in which specific supply control has started without any problem, when the feedback torque in rotational speed control has reached a third reference torque TR3 which is set in advance to a value larger than the first reference torque TR1, the specific supply control part 15 of the present embodiment determines that a sticking failure has newly occurred. The third reference torque TR3 is set to a value larger than the first reference torque TR1 and less than converted braking torque which is torque acting on the rotating electrical machine 33 according to the braking torque of the vehicle V (the torque is calculated by dividing the braking torque by the total gear ratio of the automatic transmission 35).

When the specific supply control part 15 has detected occurrence of a sticking failure based on the feedback torque of the rotating electrical machine 33, the specific supply control part 15 stops the specific supply control and subsequent learning control. At that time, the specific supply control part 15 shuts off the supply of hydraulic pressure to the engagement operating part of each of the target engagement device CLt and the specific engagement device CLs (reduces the supplied hydraulic pressure immediately). In addition, the specific supply control part 15 terminates the rotational speed control of the rotating electrical machine 33 and brings the feedback torque to zero.

Figure 14:
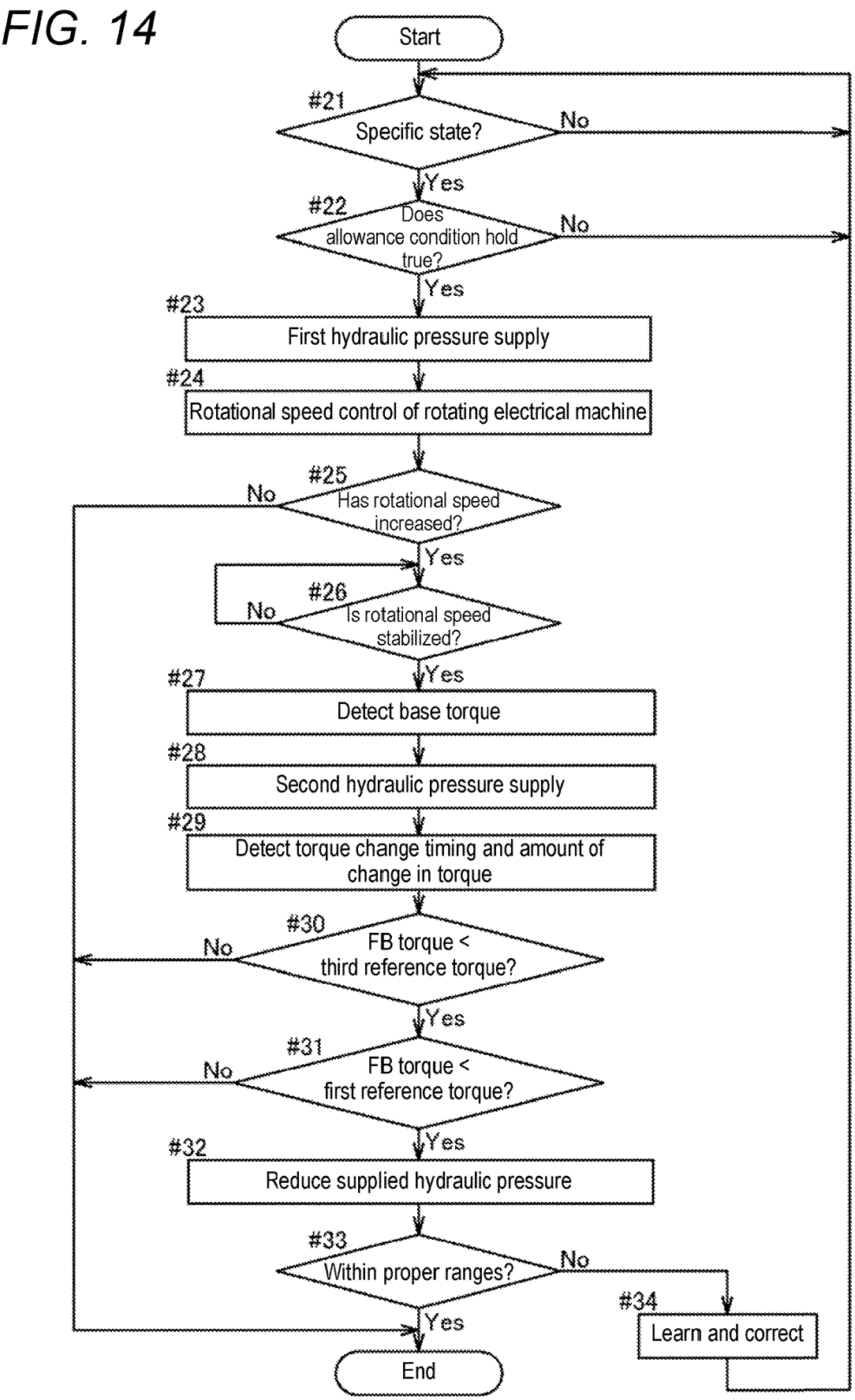
FIG. 14 is a flowchart showing a processing procedure of specific supply control and learning control of a fourth embodiment.
Figure 15:
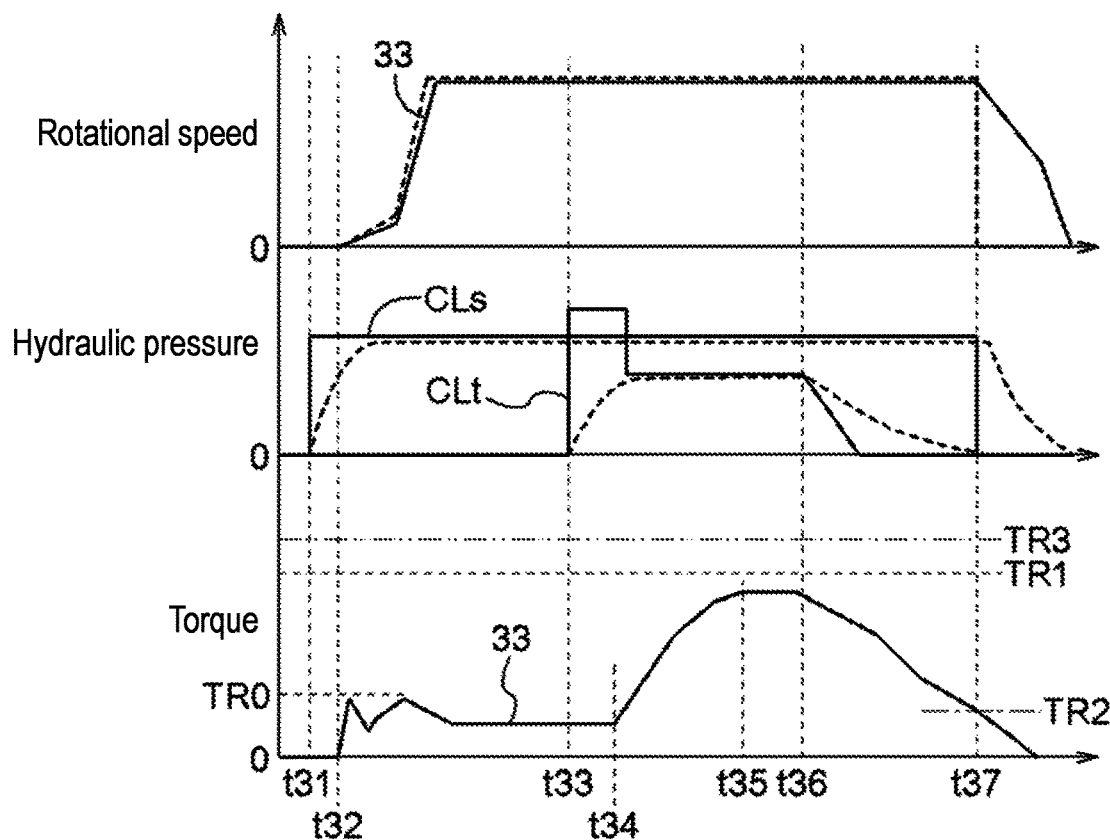
FIG. 15 is an example of a time chart for the specific supply control and the learning control.

The flow of processes for specific supply control and learning control of the present embodiment will be described below with reference to FIGS. 14 and 15. Note that the following assumes an example in which the first clutch C1 is a specific engagement device CLs and the first brake B1 is a target engagement device CLt.

First, it is determined whether a state at that point in time is a specific state (step #21). In the present embodiment, a state in which the rotating electrical machine 33 is stopped in a neutral state during vehicle stop is the specific state. If it is determined that the state is the specific state (#21: Yes), then it is determined whether an allowance condition holds true (#22). As described above, in the present embodiment, the allowance condition is that the amount of brake operation is greater than or equal to an amount of brake operation at which the braking torque of the vehicle V is greater than or equal to the potential maximum drive power to be generated.

If it is determined that the allowance condition holds true in the specific state (#21: Yes and #22: Yes), specific supply control and learning control start. In the present embodiment, first, hydraulic pressure is supplied to the engagement operating part of the specific engagement device CLs (#23 and time t31), placing the specific engagement device CLs in a complete engaged state. In addition, after starting supply of hydraulic pressure to the specific engagement device CLs, rotational speed control of the rotating electrical machine 33 is performed (#24 and t32).

After starting the rotational speed control of the rotating electrical machine 33, it is determined whether the actual rotational speed of the rotating electrical machine 33 follows a target rotational speed and is increasing (#25). Specifically, it is determined whether a difference between the actual rotational speed of the rotating electrical machine 33 and the target rotational speed for the rotational speed control is within a predetermined reference differential rotational speed, and in the present embodiment, together with such a determination, it is determined whether feedback torque is less than the initial reference torque TR0. If both determinations are affirmative, it is determined that the actual rotational speed of the rotating electrical machine 33 is appropriately increasing (#25: Yes). If the rotational speed of the rotating electrical machine 33 follows the target rotational speed and is stabilized (#26: Yes), output torque of the rotating electrical machine 33 at that time is detected as base torque (#27), and thereafter, supply of hydraulic pressure to the engagement operating part of the target engagement device CLt starts (#28 and t33). Namely, with the specific engagement device CLs placed in the complete engaged state, hydraulic pressure is supplied to the engagement operating part of the target engagement device CLt while the rotational speed control of the rotating electrical machine 33 is performed.

By doing so, the target engagement device CLt actually starts to have transmission torque capacity, and accordingly, the output torque of the rotating electrical machine 33 increases so as to maintain a target number of revolutions in the rotational speed control of the rotating electrical machine 33 (t34 to t35). The torque change timing and the amount of change in torque (feedback torque) of the rotating electrical machine 33 at this time are detected (#29). In the present embodiment, it is determined whether the detected feedback torque is less than the third reference torque TR3 (#30), and it is further determined whether the detected feedback torque is less than the first reference torque TR1 (#31). If the feedback torque is less than the first reference torque TR1 (#30: Yes and #31: Yes), thereafter, the supplied hydraulic pressure is reduced at appropriate timing (#32 and t36).

Note that by the reduction in the supplied hydraulic pressure to the target engagement device CLt, the feedback torque of the rotating electrical machine 33 also gradually decreases. When the feedback torque has eventually reached less than or equal to the second reference torque TR2 (t37), the rotational speed control of the rotating electrical machine 33 ends, and the supply of hydraulic pressure to the engagement operating part of the specific engagement device CLs is shut off.

It is determined whether each of the detected torque change timing and amount of change in torque falls within its predetermined proper range (#33). If it is determined that any of them does not fall within its proper range (#33: No), a correction is made to approach the proper range (#34). The details of learning and correction can be the same as those of each of the above-described embodiments.

Note that if the actual rotational speed of the rotating electrical machine 33 has not appropriately increased at an initial stage (#25: No; see FIG. 16), the specific supply control and learning control are stopped there. In this case, hydraulic pressure is not supplied to the engagement operating part of the target engagement device CLt.

Figure 17:
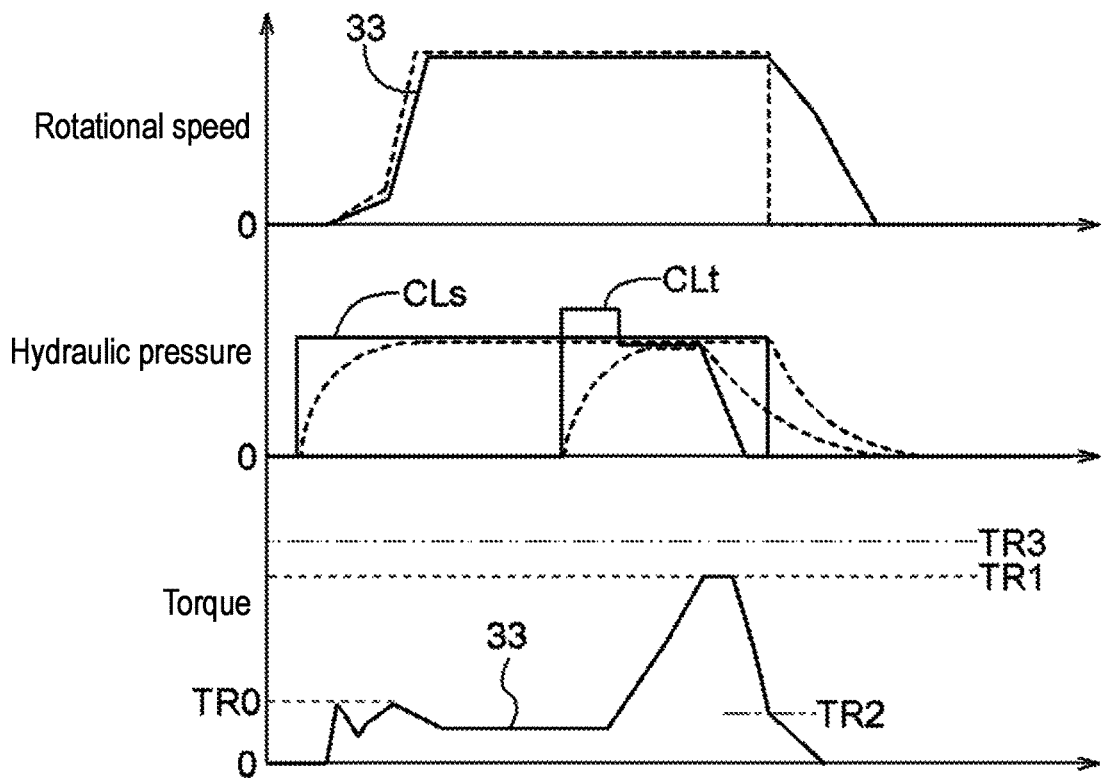
FIG. 17 is an example of a time chart for the specific supply control and the learning control.

In addition, even if the actual rotational speed of the rotating electrical machine 33 has appropriately increased at the initial stage, if the feedback torque detected at step #29 is greater than or equal to the first reference torque TR1, then the specific supply control and learning control are stopped. In this case, if the feedback torque is less than the third reference torque TR3 (#30: Yes and #31: No; see FIG. 17), the supplied hydraulic pressure to the target engagement device CLt is gradually reduced, and at a point in time when the feedback torque has eventually reached less than or equal to the second reference torque TR2, the rotational speed control of the rotating electrical machine 33 ends, and the supply of hydraulic pressure to the engagement operating part of the specific engagement device CLs is shut off.

Figure 18:
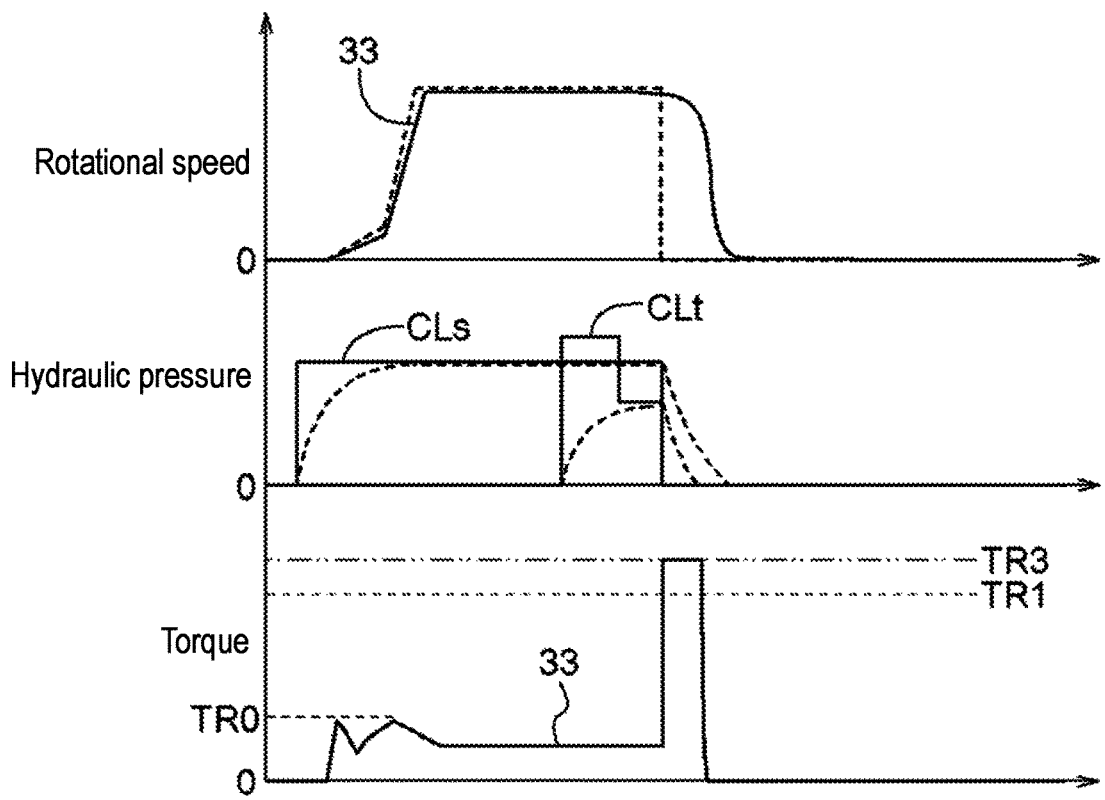
FIG. 18 is an example of a time chart for the specific supply control and the learning control.

On the other hand, if the feedback torque is further greater than or equal to the third reference torque TR3 (#30: No; see FIG. 18), the supply of hydraulic pressure to the engagement operating part of each of the target engagement device CLt and the specific engagement device CLs is shut off immediately, and the rotational speed control of the rotating electrical machine 33 ends.

In the present embodiment, too, not only upon normal N D shifting or N R shifting during operation of the internal combustion engine EG, but also in a state in which the rotating electrical machine 33 is stopped in a neutral state during vehicle stop, learning opportunities for response characteristics of a target engagement device CLt are created by performing specific supply control. As such, by intentionally creating learning opportunities even in a situation in which there are normally no transmission opportunities, response characteristics of the target engagement device CLt can be learned with high accuracy in a short period of time. Moreover, response characteristics of the target engagement device CLt can be learned with high sensitivity and higher accuracy, with a specific engagement device CLs being in a complete engaged state. Furthermore, by setting multiple guard conditions (#22, #25, #30, and #31), starting of the vehicle V against a driver's intention and occurrence of shock can be avoided while high-sensitivity learning is performed.

Other Embodiments (1) The above-described embodiments describe, as an example, a configuration in which in learning control, changes in the torque of the rotating electrical machine 33 after supplying hydraulic pressure to the engagement operating part of the target engagement device CLt are detected, and the engagement start timing and engagement start hydraulic pressure of the target engagement device CLt are learned based on results of the detection. However, the configuration is not limited thereto, and for example, only the engagement start timing or only the engagement start hydraulic pressure of the target engagement device CLt may be learned based on results of detection of changes in the torque of the rotating electrical machine 33. Alternatively, for example, a change in the rotational speed of the transmission input member 34 of the automatic transmission 35 after supplying hydraulic pressure to the engagement operating part of the target engagement device CLt may be detected, and the engagement start timing of the target engagement device CLt may be learned based on a result of the detection.

(2) The above-described embodiments describe, as an example, a configuration in which specific supply control and learning control are performed only when the allowance condition holds true. However, the configuration is not limited thereto, and as long as a state is the specific state, specific supply control and learning control may be unconditionally performed. In addition, in the third embodiment, instead of determining whether the allowance condition holds true, different rotational speeds of the rotating electrical machine 33 may be set according to vehicle speed so that during performance of specific supply control and learning control, the one-way clutch F is maintained in an unengaged state even if the target engagement device CLt is engaged. In this case, the rotational speed of the rotating electrical machine 33 is determined such that the rotational speeds of the second sun gear S3 and the ring gear R1 is less than or equal to a rotational speed that is obtained when the rotational speed of the common ring gear R2 is determined in proportion to vehicle speed and the rotational speed of the common carrier CA2 is zero.

Figure 19:
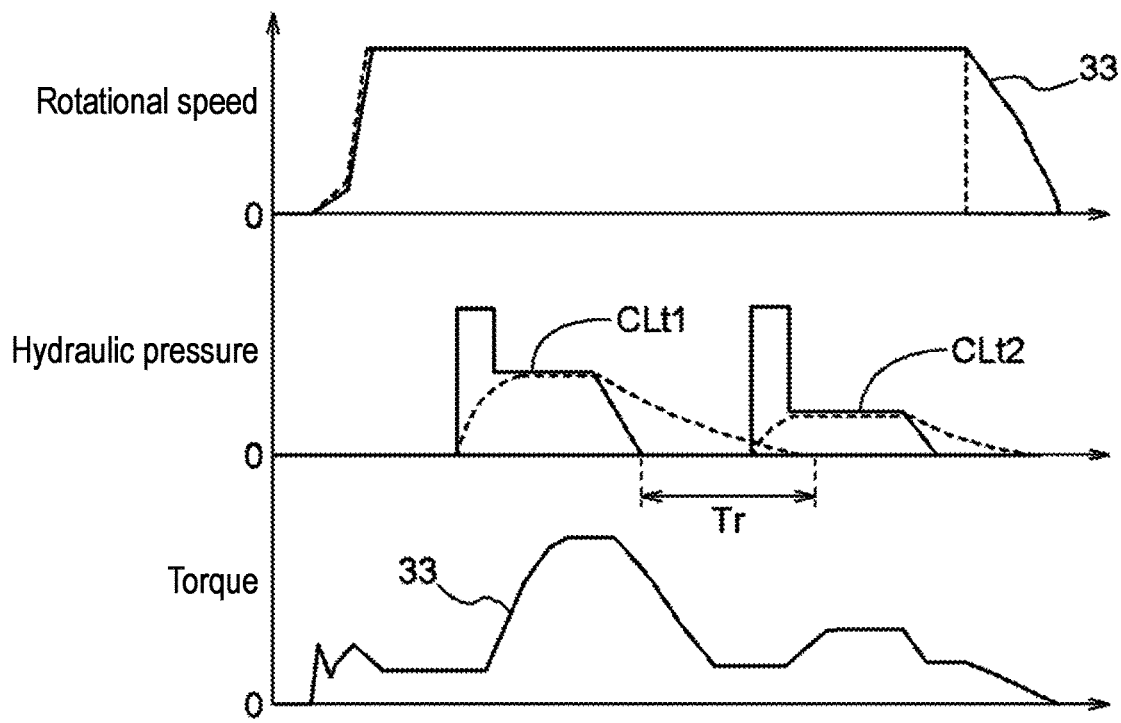
FIG. 19 is a time chart for specific supply control and learning control in another mode.

(3) The above-described embodiments make a description assuming mainly a configuration in which specific supply control and learning control are performed targeting one specific engagement device CLs at each point in time. However, the configuration is not limited thereto, and using a plurality of transmission engagement devices CL as target engagement devices CLt, specific supply control and learning control may be sequentially performed targeting those devices. In this case, after completing learning control for a first target engagement device CLt and remaining oil in the first target engagement device CLt is completely released (i.e., after a lapse of a predetermined remaining oil release time), learning control for a second target engagement device CLt may be performed then. Alternatively, as shown in FIG. 19, with rotational speed control of the rotating electrical machine 33 being continuously performed, a target engagement device CLt may be switched to another between a plurality of transmission engagement devices CL to sequentially perform supply of hydraulic pressure to the engagement operating parts of those plurality of target engagement devices CLt. In this case, after completing learning control for the first target engagement device CLt (indicated by "CLt1" in FIG. 19) and before remaining oil in the first target engagement device CLt is completely released (i.e., without waiting for a remaining oil release time Tr to elapse), learning control for the second target engagement device CLt (indicated by "CLt2") may start.

Figure 20:
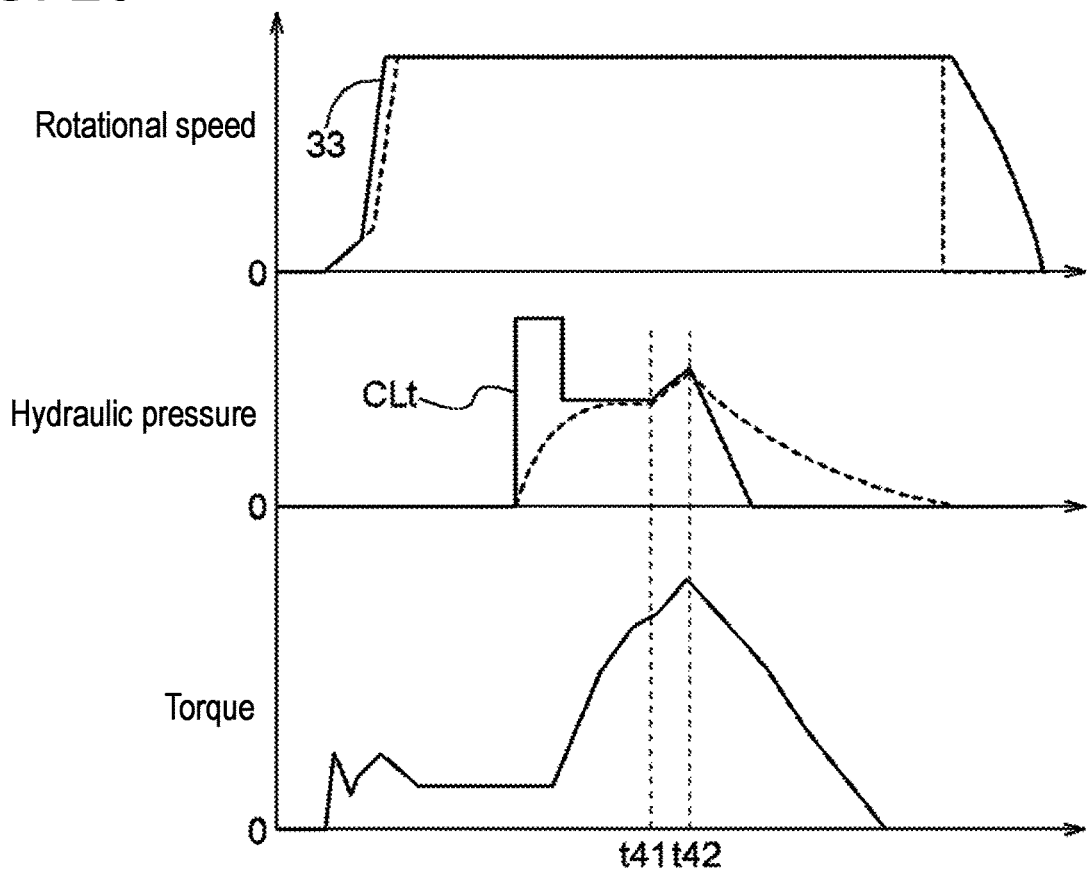
FIG. 20 is a time chart for specific supply control and learning control in another mode.

(4) The above-described embodiments describe, as an example, a configuration in which in learning control, a step correction to the engagement start hydraulic pressure of the target engagement device CLt is repeatedly made until it is determined that the amount of change in torque (the amount of change in feedback torque) falls within a proper range. However, the configuration is not limited thereto, and the engagement start hydraulic pressure of the target engagement device CLt may be corrected to a proper value by performing learning control only once. To do so, for example, as shown in FIG. 20, in specific supply control, after supplied hydraulic pressure to the engagement operating part of the target engagement device CLt is stabilized, the supplied hydraulic pressure is gradually increased at a constant rate (time t41 to t42). On the other hand, a proper amount for the amount of change in torque (the amount of change in feedback torque) of the rotating electrical machine 33 is set in advance according to a proper value of the engagement start hydraulic pressure of the target engagement device CLt. Then, the engagement start hydraulic pressure of the target engagement device CLt is linearly corrected according to the amount of increase in supplied hydraulic pressure obtained at a point in time when the amount of change in the torque of the rotating electrical machine 33 has reached the proper amount.

(5) The above-described embodiments describe, as an example, a configuration in which in specific supply control, the rotating electrical machine 33 is driven in a neutral state, and hydraulic pressure is supplied to the engagement operating part of the target engagement device CLt with the rotating electrical machine 33 being driven. However, the configuration is not limited thereto, and for example, in specific supply control, the internal combustion engine EG may be driven in a neutral state, and hydraulic pressure may be supplied to the engagement operating part of the target engagement device CLt with the internal combustion engine EG being driven. In this case, engagement characteristics of the target engagement device CLt are learned based on a change in the rotational speed of the transmission input member 34 of the automatic transmission 35. Alternatively, in specific supply control, both the rotating electrical machine 33 and the internal combustion engine EG may be driven in a neutral state, and hydraulic pressure may be supplied to the engagement operating part of the target engagement device CLt with both the rotating electrical machine 33 and the internal combustion engine EG being driven.

Figure 21:
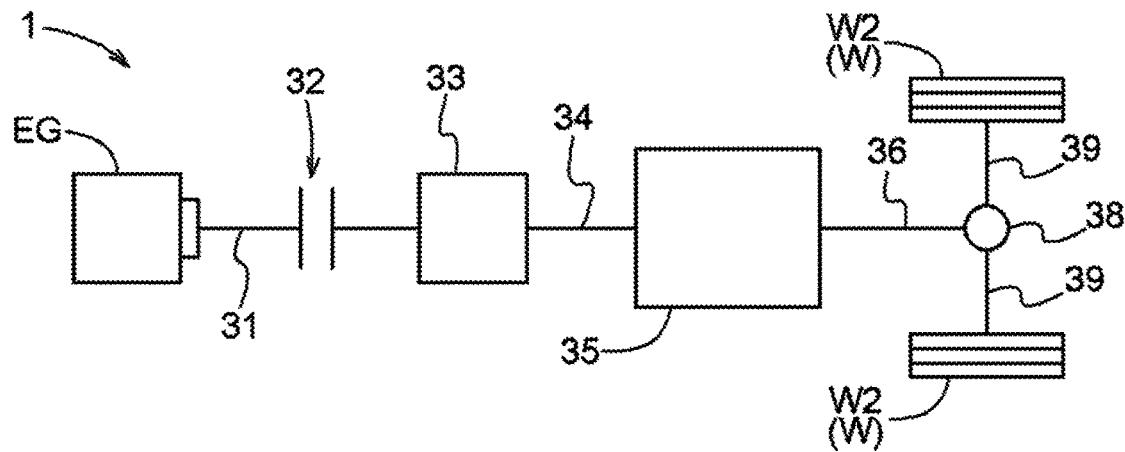
FIG. 21 is a schematic diagram of a vehicle drive device in another mode.

(6) The above-described embodiments describe, as an example, a configuration in which the vehicle drive device 3 is a drive device for an FF vehicle. However, the configuration is not limited thereto, and for example, as shown in FIG. 21, the vehicle drive device 3 may be a drive device for a front-engine rear-drive (FR) vehicle. In this case, the internal combustion engine EG and the rotating electrical machine 33 are drive-coupled to the second wheels W2 (an example of the wheels W). In addition, for example, a dedicated second disconnection engagement device or a hydraulic coupling having a direct-coupling engagement device (a torque converter, a fluid coupling, etc.) may be further provided between the rotating electrical machine 33 and the automatic transmission 35.

Figure 22:
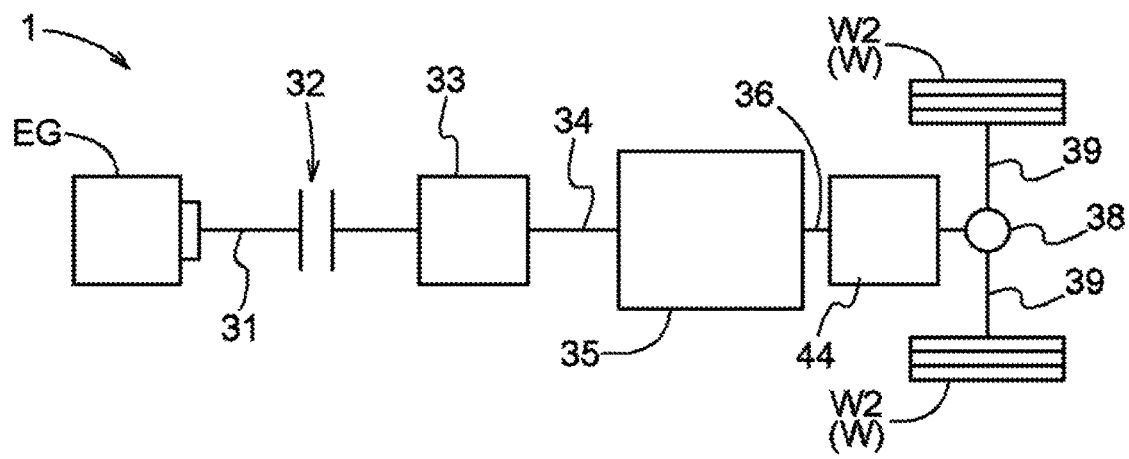
FIG. 22 is a schematic diagram of a vehicle drive device in another mode.

(7) The above-described third embodiment describes, as an example, a configuration in which the vehicle drive device 3 is provided with the second rotating electrical machine 44 so that drive power can be transmitted to the second wheels W2 which are independent of the internal combustion engine EG and the rotating electrical machine 33. However, the configuration is not limited thereto, and for example, as shown in FIG. 22, the second rotating electrical machine 44 serving as another drive power source (third drive power source) may be provided to the vehicle drive device 3 more on an output member 39 side than the automatic transmission 35 in the power transmission path connecting the internal combustion engine EG to the wheels W. Alternatively, in the vehicle drive device 3 for an FF vehicle such as that in the first embodiment, for example, the second rotating electrical machine 44 may be provided so that drive power can be transmitted to the counter gear mechanism 37 or the differential gear device 38.

Figure 23:
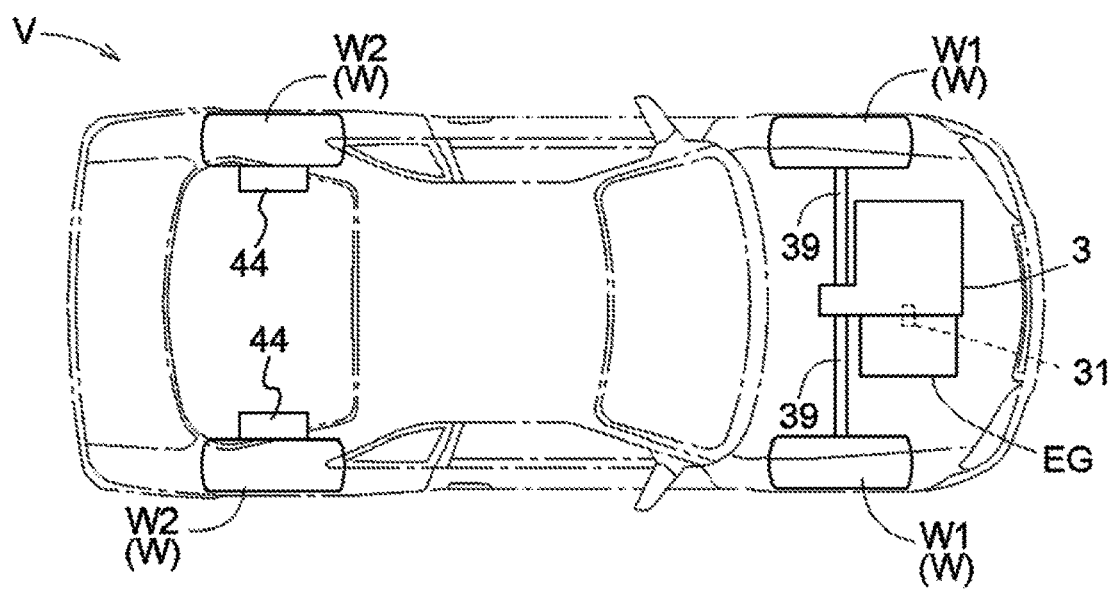
FIG. 23 is a schematic diagram of a vehicle drive device in another mode.

(8) The above-described third embodiment describes, as an example, a configuration in which a single second rotating electrical machine 44 is drive-coupled to the pair of second wheels W2 via the second differential gear device 48 and the pair of second output members 49. However, the configuration is not limited thereto, and for example, as shown in FIG. 23, the second rotating electrical machines 44 which are independent of each other may be drive-coupled to the pair of second wheels W2, respectively.

(9) A configuration disclosed in each of the aforementioned embodiments (including the above-described embodiments and other embodiments; the same applies hereinafter) can also be applied in combination with a configuration disclosed in another embodiment as long as a contradiction does not arise. For other configurations, too, the embodiments disclosed in this specification are to be considered in all respects as illustrative, and modifications may be made therein as appropriate without departing from the true spirit and scope of the present disclosure.

SUMMARY OF THE EMBODIMENTS

When the above description is summarized, a control device according to the present disclosure preferably has each of the following configurations.

In a control device (1) whose control target is a vehicle drive device (3) provided with an automatic transmission (35) having a plurality of hydraulically actuated transmission engagement devices (CL) in a power transmission path that connects an input member (31) drive-coupled to an internal combustion engine (EG) to output members (39) drive-coupled to wheels (W), in the vehicle drive device (3), a rotating electrical machine (33) is provided more on the input member (31) side than the automatic transmission (35) in the power transmission path, and specific supply control is performed, the specific supply control driving at least one of the rotating electrical machine (33) and the internal combustion engine (EG) in a neutral state, and supplying hydraulic pressure to an engagement operating part of a target engagement device (CLt) with at least one of the rotating electrical machine (33) and the internal combustion engine (EG) being driven, the automatic transmission (35) not transmitting power in the neutral state, and the target engagement device (CLt) being one of the plurality of transmission engagement devices (CL).

According to this configuration, by actively driving at least one of the rotating electrical machine (33) and the internal combustion engine (EG) in a neutral state, a rotating member on an input side of the automatic transmission (35) can be rotated. Then, in that state, by supplying hydraulic pressure to the engagement operating part of the target engagement device (CLt), response characteristics of the transmission engagement device (CL) can be learned. As such, according to this configuration, learning is possible even in a situation in which normally the rotating member on the input side of the automatic transmission (35) does not rotate, and thus, many learning opportunities for response characteristics of the transmission engagement devices (CL) can be easily secured.

In one aspect, it is preferred that in the specific supply control, hydraulic pressure not be supplied to engagement operating parts of the other transmission engagement devices (CL) than the target engagement device (CLt).

According to this configuration, since other transmission engagement devices (CL) than the target engagement device (CLt) are maintained in a disengaged state, occurrence of shock due to unintended power transmission can be avoided.

In one aspect, it is preferred that in the specific supply control, hydraulic pressure be supplied to the engagement operating part of the target engagement device (CLt) with hydraulic pressure being supplied to an engagement operating part of one (CLs) of the other transmission engagement devices (CL) than the target engagement device (CLt).

According to this configuration, response characteristics of the transmission engagement devices (CL) can be accurately learned.

In one aspect, it is preferred that in the specific supply control, after supplying hydraulic pressure to the engagement operating part of the target engagement device (CLt), the supplied hydraulic pressure be reduced.

According to this configuration, after learning response characteristics of a transmission engagement device (CL), the state of the automatic transmission (35) can be brought back to its original state. In addition, thereafter, hydraulic pressure can be supplied to the engagement operating part of the target engagement device (CLt) again, and in that case, many more learning opportunities can be secured.

In one aspect, it is preferred that in the vehicle drive device (3), another drive power source (44) be provided more on the output member (39) side than the automatic transmission (35) in the power transmission path, or so that drive power can be transmitted to second wheels (W) independent of the power transmission path, the other drive power source (44) being a drive power source different than the internal combustion engine (EG) and the rotating electrical machine (33), and the specific supply control be performed while a vehicle is traveling by drive power of the other drive power source (44).

According to this configuration, for example, even in a situation in which the vehicle travels by drive power of another drive power source (44) different than the rotating electrical machine (33) and there are normally no transmission opportunities, response characteristics of the transmission engagement devices (CL) can be learned. Thus, it becomes easier to secure many learning opportunities.

In one aspect, it is preferred that the specific supply control be performed during vehicle stop.

According to this configuration, for example, even in a situation in which the vehicle is being stopped and there are normally no transmission opportunities, response characteristics of the transmission engagement devices (CL) can be learned. Thus, it becomes easier to secure many learning opportunities.

In one aspect, it is preferred that the specific supply control be performed with the rotating electrical machine (33) generating electric power while rotating together with the internal combustion engine (EG) in the neutral state.

According to this configuration, for example, in a situation in which charging of an electrical storage device serving as a power source of the rotating electrical machine (33) is performed during vehicle stop, response characteristics of the transmission engagement devices (CL) can be learned. Therefore, many learning opportunities can be secured while suppressing a reduction in the energy efficiency of the vehicle drive device (3), compared to a case of driving the rotating electrical machine (33) only for learning.

In one aspect, it is preferred that with the rotating electrical machine (33) generating electric power while rotating together with the internal combustion engine (EG) in the neutral state, the specific supply control be performed while rotational speed control of the rotating electrical machine (33) is performed using rotational speeds of the internal combustion engine (EG) and the rotating electrical machine (33) obtained before supplying hydraulic pressure, as a target rotational speed.

According to this configuration, it becomes easier to secure many learning opportunities while suppressing influence on charging of the electrical storage device having been performed therebefore to a small level. In addition, by using the fact that after supplying hydraulic pressure to the engagement operating part of the target engagement device (CLt), for example, feedback torque in rotational speed control changes, response characteristics of the transmission engagement devices (CL) can be learned.

In one aspect, it is preferred that learning control be performed, the learning control detecting at least one of a change in a rotational speed of a transmission input member (34) of the automatic transmission (35) and a change in torque of the rotating electrical machine (33), and learning at least one of engagement start timing and engagement start hydraulic pressure of the target engagement device (CLt) based on a result of the detection, the changes being made after supplying hydraulic pressure to the engagement operating part of the target engagement device (CLt).

According to this configuration, by actually learning at least one of the engagement start timing and engagement start hydraulic pressure of the target engagement device (CLt) by utilizing many learning opportunities, response characteristics of the target engagement device (CLt) can be learned with high accuracy in a short period of time. Thus, upon forming a target shift speed from a neutral state in the automatic transmission (35), it becomes easier to promptly form the target shift speed with little shock.

In one aspect, it is preferred that in the specific supply control, hydraulic pressure be supplied to the engagement operating part of the target engagement device (CLt) while rotational speed control of the rotating electrical machine (33) is performed, and in the learning control, change start timing of and an amount of change in feedback torque in the rotational speed control be detected as changes in torque of the rotating electrical machine (33), and engagement start timing and engagement start hydraulic pressure of the target engagement device (CLt) be learned based on results of the detection.

According to this configuration, the engagement start timing and engagement start hydraulic pressure of the target engagement device (CLt) can be learned based on the change start timing of and the amount of change in feedback torque in rotational speed control which are obtained after supplying hydraulic pressure to the engagement operating part of the target engagement device (CLt). Thus, response characteristics of the transmission engagement devices (CL) can be appropriately learned.

In one aspect, it is preferred that in the learning control, a correction to engagement start timing and engagement start hydraulic pressure (Pse) of the target engagement device (CLt) be repeatedly made until detected changes in torque of the rotating electrical machine (33) fall within their predetermined proper ranges.

According to this configuration, proper engagement start timing and proper engagement start hydraulic pressure (Pse) of the target engagement device (CLt) can be achieved by a relatively simple process. At this time, according to the technique of the present disclosure, many learning opportunities can be secured, and thus, proper engagement start timing and proper engagement start hydraulic pressure (Pse) can be achieved in a short period of time yet by a relatively simple process.

In one aspect, it is preferred that in the specific supply control, after supplied hydraulic pressure to the engagement operating part of the target engagement device (CLt) is stabilized, the supplied hydraulic pressure be gradually increased, and in the learning control, engagement start hydraulic pressure (Pse) of the target engagement device (CLt) be corrected according to an amount of increase in supplied hydraulic pressure obtained at a point in time when a change in torque of the rotating electrical machine (33) has reached a predetermined proper amount.

According to this configuration, proper engagement start hydraulic pressure (Pse) can be achieved by performing learning control only once for a single target engagement device (CLt). Thus, proper engagement start hydraulic pressure (Pse) can be achieved at a very early stage.

In one aspect, it is preferred that the automatic transmission (35) further include a one-direction engagement device (F) that forms one shift speed in cooperation with the target engagement device (CLt), and the specific supply control and the learning control be performed only during traveling of the vehicle in a vehicle speed range that maintains the one-direction engagement device (F) in an unengaged state even if the target engagement device (CLt) is engaged.

According to this configuration, a situation in which when specific supply control and learning control are performed, the vehicle accelerates against a driver's intention can be avoided.

In one aspect, it is preferred that the automatic transmission (35) further include a one-direction engagement device (F) that forms one shift speed in cooperation with the target engagement device (CLt), and different rotational speeds of the rotating electrical machine (33) be set according to vehicle speed so that during performance of the specific supply control and the learning control, the one-direction engagement device (F) can be maintained in an unengaged state even if the target engagement device (CLt) is engaged.

According to this configuration, a situation in which when specific supply control and learning control are performed, the vehicle accelerates against a driver's intention can be avoided without excessively limiting learning opportunities.

In one aspect, it is preferred that the automatic transmission (35) further include a one-direction engagement device (F) that forms one shift speed in cooperation with the target engagement device (CLt), and during vehicle stop, the specific supply control and the learning control be performed only when a pedal operation is performed on a brake pedal.

According to this configuration, a situation in which when specific supply control and learning control are performed, the vehicle starts against a driver's intention can be avoided.

In one aspect, it is preferred that in the specific supply control, upon starting the specific supply control, rotational speed control be performed to increase a rotational speed of the rotating electrical machine (33), and when a difference between an actual rotational speed of the rotating electrical machine (33) and a target rotational speed for the rotational speed control has reached a predetermined reference differential rotational speed (Rd) within a predetermined time, the specific supply control be stopped.

According to this configuration, at an initial stage of specific supply control, occurrence of an abnormality (e.g., an abnormality such as a sticking failure) in the target engagement device (CLt) can be found at an early stage. Thus, for example, when a shift speed is formed by engagement of the target engagement device (CLt) and the one-direction engagement device (F), a situation in which the vehicle starts against a driver's intention can be avoided. In addition, when hydraulic pressure is supplied to the target engagement device (CLt) with one (CLs) of other transmission engagement devices (CL) than the target engagement device (CLt) being engaged in advance, too, a situation in which the vehicle starts against a driver's intention can be avoided.

In one aspect, it is preferred that in the specific supply control, hydraulic pressure be supplied to the engagement operating part of the target engagement device (CLt) while rotational speed control of the rotating electrical machine (33) is performed, and when feedback torque in the rotational speed control has reached a predetermined first reference torque (TR1), the specific supply control be stopped, and supplied hydraulic pressure to the engagement operating part of the target engagement device (CLt) be gradually reduced.

According to this configuration, occurrence of an abnormality (e.g., an abnormality such as detection of an abnormal value in a case of detecting feedback torque in rotational speed control for subsequent learning) in the target engagement device (CLt) can be found in the middle of specific supply control. Thus, relatively large torque, though the torque does not start the vehicle, can be avoided from acting on the wheels. In addition, inconvenience that erroneous learning is performed based on an abnormal value can be avoided.

In one aspect, it is preferred that after supplied hydraulic pressure to the engagement operating part of the target engagement device (CLt) starts to be reduced and feedback torque in the rotational speed control has reached a second reference torque (TR2), the rotational speed control end, the second reference torque (TR2) being set in advance to a value smaller than the first reference torque (TR1).

According to this configuration, rotational speed control ends after feedback torque has become sufficiently small, and thus, inertia torque upon ending the rotational speed control can be suppressed to a small level. Namely, while specific supply control is stopped in the middle, torque fluctuation that can occur due to the stop of the specific supply control can be suppressed to a small level.

In one aspect, it is preferred that when feedback torque in the rotational speed control has reached a third reference torque (TR3), the specific supply control be stopped, supply of hydraulic pressure to the engagement operating part of the target engagement device (CLt) be shut off, and the rotational speed control be stopped, the third reference torque (TR3) being set in advance to a value larger than the first reference torque (TR1).

According to this configuration, occurrence of an abnormality (e.g., an abnormality such as a sticking failure) in the target engagement device (CLt) can be found in the middle of specific supply control. Then, in such a case, the specific supply control is stopped immediately, by which supply of hydraulic pressure to the engagement operating part of the target engagement device (CLt) can be shut off and rotational speed control can be stopped. Thus, for example, when a shift speed is formed by engagement of the target engagement device (CLt) and the one-direction engagement device (F), a situation in which the vehicle starts against a driver's intention can be avoided. In addition, when hydraulic pressure is supplied to the target engagement device (CLt) with one (CLs) of other transmission engagement devices (CL) than the target engagement device (CLt) being engaged in advance, too, a situation in which the vehicle starts against a driver's intention can be avoided.

In one aspect, it is preferred that in the specific supply control, with at least one of the rotating electrical machine (33) and the internal combustion engine (EG) being continuously driven, the target engagement device (CLt) be switched to another among the plurality of transmission engagement devices (CL) to sequentially perform supply of hydraulic pressure to engagement operating parts of the plurality of target engagement devices (CLt).

According to this configuration, for example, when response characteristics of each transmission engagement device (CL) are learned based on phenomena occurring by specific supply control, without waiting for remaining oil to be released from the engagement operating part of a preceding target engagement device (CLt), learning of a subsequent target engagement device (CLt) can be performed. Thus, response characteristics of each of the plurality of transmission engagement devices (CL) can be efficiently learned in a short period of time.

In one aspect, it is preferred that the automatic transmission (35) be a stepped automatic transmission capable of switching between a plurality of shift speeds by selectively engaging any two or more of the plurality of transmission engagement devices (CL), and the target engagement device (CLt) be one of the two or more transmission engagement devices (CL) to be engaged to form a target shift speed at that point in time.

According to this configuration, for example, when response characteristics of a transmission engagement device (CL) are learned during traveling of the vehicle in a neutral state of the automatic transmission (35), upon stepping on an accelerator during learning, a target shift speed at that point in time can be formed at an early stage. Thus, the vehicle can be accelerated with a good response.

The control device according to the present disclosure can provide at least one of the aforementioned advantageous effects.

The invention claimed is:

1. A control device whose control target is a vehicle drive device provided with an automatic transmission having a plurality of hydraulically actuated transmission engagement devices in a power transmission path that connects an input drive-coupled to an internal combustion engine to outputs drive-coupled to wheels, wherein in the vehicle drive device, a rotating electrical machine is provided more on an input side than the automatic transmission in the power transmission path, the control device comprising:
an electronic control unit that is configured to perform specific supply control, the specific supply control driving at least one of the rotating electrical machine and the internal combustion engine in a neutral state, and supplying hydraulic pressure to an engagement operating part of a target engagement device with at least one of the rotating electrical machine and the internal combustion engine being driven, the automatic transmission not transmitting power in the neutral state, and the target engagement device being one of the plurality of transmission engagement devices,
wherein in the specific supply control, after supplying hydraulic pressure to the engagement operating part of the target engagement device, the supplied hydraulic pressure is reduced.

2. The control device according to claim 1, wherein in the specific supply control, hydraulic pressure is not supplied to engagement operating parts of other transmission engagement devices than the target engagement device.

3. The control device according to claim 1, wherein in the specific supply control, hydraulic pressure is supplied to the engagement operating part of the target engagement device with hydraulic pressure being supplied to an engagement operating part of one of other transmission engagement devices than the target engagement device.

4. The control device according to claim 1, wherein
in the vehicle drive device, another drive power source is provided more on an output side than the automatic transmission in the power transmission path, or so that drive power can be transmitted to second wheels independent of the power transmission path, another drive power source being a drive power source different than the internal combustion engine and the rotating electrical machine, and
the specific supply control is performed while a vehicle is traveling by drive power of the another drive power source.

5. The control device according to claim 1, wherein the specific supply control is performed during vehicle stop.

6. The control device according to claim 1, wherein the specific supply control is performed with the rotating electrical machine generating electric power while rotating together with the internal combustion engine in the neutral state.

7. The control device according to claim 6, wherein with the rotating electrical machine generating electric power while rotating together with the internal combustion engine in the neutral state, the specific supply control is performed while rotational speed control of the rotating electrical machine is performed using rotational speeds of the internal combustion engine and the rotating electrical machine obtained before supplying hydraulic pressure, as a target rotational speed.

8. The control device according to claim 1, wherein the electronic control unit is configured to perform learning control, the learning control detecting at least one of a change in a rotational speed of a transmission input of the automatic transmission and a change in torque of the rotating electrical machine, and learning at least one of engagement start timing and engagement start hydraulic pressure of the target engagement device based on a result of the detection, the changes being made after supplying hydraulic pressure to the engagement operating part of the target engagement device.

9. The control device according to claim 8, wherein
in the specific supply control, hydraulic pressure is supplied to the engagement operating part of the target engagement device while rotational speed control of the rotating electrical machine is performed, and
in the learning control, change start timing of and an amount of change in feedback torque in the rotational speed control are detected as changes in torque of the rotating electrical machine, and engagement start timing and engagement start hydraulic pressure of the target engagement device are learned based on results of the detection.

10. The control device according to claim 9, wherein in the learning control, a correction to engagement start timing and engagement start hydraulic pressure of the target engagement device is repeatedly made until detected changes in torque of the rotating electrical machine fall within their predetermined proper ranges.

11. The control device according to claim 9, wherein
in the specific supply control, after supplied hydraulic pressure to the engagement operating part of the target engagement device is stabilized, the supplied hydraulic pressure is gradually increased, and
in the learning control, engagement start hydraulic pressure of the target engagement device is corrected according to an amount of increase in supplied hydraulic pressure obtained at a point in time when a change in torque of the rotating electrical machine has reached a predetermined proper amount.

12. The control device according to claim 8, wherein
the automatic transmission further includes a one-direction engagement device that forms one shift speed in cooperation with the target engagement device, and
the specific supply control and the learning control are performed only during traveling of the vehicle in a vehicle speed range that maintains the one-direction engagement device in an unengaged state even if the target engagement device is engaged.

13. The control device according to claim 8, wherein
the automatic transmission further includes a one-direction engagement device that forms one shift speed in cooperation with the target engagement device, and
different rotational speeds of the rotating electrical machine are set according to vehicle speed so that during performance of the specific supply control and the learning control, the one-direction engagement device can be maintained in an unengaged state even if the target engagement device is engaged.

14. The control device according to claim 8, wherein
the automatic transmission further includes a one-direction engagement device that forms one shift speed in cooperation with the target engagement device, and
during vehicle stop, the specific supply control and the learning control are performed only when a pedal operation is performed on a brake pedal.

15. The control device according to claim 1, wherein
in the specific supply control, upon starting the specific supply control, rotational speed control is performed to increase a rotational speed of the rotating electrical machine, and
when a difference between an actual rotational speed of the rotating electrical machine and a target rotational speed for the rotational speed control has reached a predetermined reference differential rotational speed within a predetermined time, the specific supply control is stopped.

16. The control device according to claim 1, wherein
in the specific supply control, hydraulic pressure is supplied to the engagement operating part of the target engagement device while rotational speed control of the rotating electrical machine is performed, and
when feedback torque in the rotational speed control has reached a predetermined first reference torque, the specific supply control is stopped, and supplied hydraulic pressure to the engagement operating part of the target engagement device is gradually reduced.

17. The control device according to claim 16, wherein
after supplied hydraulic pressure to the engagement operating part of the target engagement device starts to be reduced and feedback torque in the rotational speed control has reached a second reference torque, the rotational speed control ends, the second reference torque being set in advance to a value smaller than the first reference torque.

18. The control device according to claim 16, wherein
when feedback torque in the rotational speed control has reached a third reference torque, the specific supply control is stopped, supply of hydraulic pressure to the engagement operating part of the target engagement device is shut off, and the rotational speed control is stopped, the third reference torque being set in advance to a value larger than the first reference torque.

19. The control device according to claim 1, wherein in the specific supply control, with at least one of the rotating electrical machine and the internal combustion engine being continuously driven, the target engagement device is switched to another among the plurality of transmission engagement devices to sequentially perform supply of hydraulic pressure to engagement operating parts of the plurality of target engagement devices.

20. The control device according to claim 1, wherein
the automatic transmission is a stepped automatic transmission capable of switching between a plurality of shift speeds by selectively engaging any two or more of the plurality of transmission engagement devices, and
the target engagement device is one of the two or more transmission engagement devices to be engaged to form a target shift speed at that point in time.

\* \* \* \* \*